United States Patent
Liao

(10) Patent No.: US 12,185,106 B2
(45) Date of Patent: Dec. 31, 2024

(54) ENABLING INTERACTIVE SERVICE FOR CLOUD RENDERTING GAMING IN 5G SYSTEMS

(71) Applicant: Apple Inc., Cupertino, CA (US)

(72) Inventor: Ching-Yu Liao, Portland, OR (US)

(73) Assignee: Apple Inc., Cupertino, CA (US)

( * ) Notice: Subject to any disclaimer, the term of this patent is extended or adjusted under 35 U.S.C. 154(b) by 513 days.

(21) Appl. No.: 17/427,819

(22) PCT Filed: Feb. 6, 2020

(86) PCT No.: PCT/US2020/017068
§ 371 (c)(1),
(2) Date: Aug. 2, 2021

(87) PCT Pub. No.: WO2020/163635
PCT Pub. Date: Aug. 13, 2020

(65) Prior Publication Data
US 2022/0141662 A1    May 5, 2022

Related U.S. Application Data

(60) Provisional application No. 62/802,153, filed on Feb. 6, 2019.

(51) Int. Cl.
*H04W 12/08* (2021.01)
*A63F 13/355* (2014.01)
(Continued)

(52) U.S. Cl.
CPC .......... *H04W 12/08* (2013.01); *A63F 13/355* (2014.09); *H04L 67/10* (2013.01); *H04W 12/37* (2021.01); *H04W 84/042* (2013.01)

(58) Field of Classification Search
CPC ... H04W 12/08; H04W 12/37; H04W 84/042; A63F 13/355; H04L 67/10
(Continued)

(56) References Cited

U.S. PATENT DOCUMENTS 10,367,744 B1 * 7/2019 Li .......................... G06F 9/5072
2010/0138651 A1 * 6/2010 Wang ...................... H04L 63/08
709/229
(Continued)

OTHER PUBLICATIONS

OPPO: "Clarification on UE policy distribution", 3GPP Draft; 23503_CR0146R2_5GS_PH1_(REL-15)_S2-1811334WAS11259 WAS10208 Clarification on UE Policy Distribution—CR, 3rd Generation Partnership Project (3GPP), Mobile Competence Centre; 650 Route D, vol. SA WG2, No. Dongguan, China; Oct. 15, 2018-Oct. 19, 2018, Dec. 4, 2018 (Dec. 4, 2018), XP051568084, retrieved from the internet: URL:http://www/3gpp.org/ftp/Meetings%5F3GPP%5FSYNC/SA/Docs/SP%2D181086%2Ezip [retrieved on Dec. 4, 2018].
(Continued)

*Primary Examiner* — Thanh T Le
(74) *Attorney, Agent, or Firm* — Sterne, Kessler, Goldstein & Fox P.L.L.C.

(57) ABSTRACT

The present disclosure is directed to systems and methods for providing interactive services to a device. For example, a method may include determining service authorization information for a device, the service authorization information being associated with an interactive service on a wireless network. The method may also include determining device policies for the device based on the service authorization information. The method may also include transmitting the device policies to the device, wherein the device policies cause the device to select a cloud rendering server for the interactive service.

17 Claims, 17 Drawing Sheets

(51) Int. Cl.
*H04L 67/10* (2022.01)
*H04W 12/37* (2021.01)
*H04W 84/04* (2009.01)

(58) Field of Classification Search
USPC .............................................................. 726/1
See application file for complete search history.

(56) References Cited

U.S. PATENT DOCUMENTS

| | | | | |
|---|---|---|---|---|
| 2010/0289803 | A1* | 11/2010 | Klosowski | G06F 3/1438 345/502 |
| 2011/0227934 | A1* | 9/2011 | Sharp | G16H 30/20 345/502 |
| 2012/0283018 | A1* | 11/2012 | Berner | A63F 13/352 463/42 |
| 2012/0303831 | A1* | 11/2012 | Toshniwal | H04L 65/1069 709/229 |
| 2015/0196841 | A1* | 7/2015 | Lee | H04L 43/04 463/42 |
| 2016/0182685 | A1* | 6/2016 | Moran | H04W 4/021 709/203 |
| 2017/0196033 | A1* | 7/2017 | Zhu | H04W 76/14 |
| 2017/0220394 | A1* | 8/2017 | Shim | H04W 4/70 |
| 2017/0312626 | A1* | 11/2017 | Colenbrander | H04L 67/10 |
| 2017/0346755 | A1* | 11/2017 | Caminiti | H04L 67/562 |
| 2019/0081942 | A1* | 3/2019 | Suresh | H04L 63/0815 |
| 2019/0141015 | A1* | 5/2019 | Nellen | H04L 63/0272 |
| 2020/0143583 | A1* | 5/2020 | Jiang | G06T 15/005 |
| 2020/0204619 | A1* | 6/2020 | Graham | H04L 67/1097 |
| 2021/0329460 | A1* | 10/2021 | Liao | H04W 12/37 |

OTHER PUBLICATIONS

Ericcson et al: "eV2X architecture reference model for 5G", 3GPP Draft; S2-181098_1086_WAS_180208_EV2X_5G_ARCH_CL, 3rd Generation Partnership Project (3GPP), Mobile Competence Centre; 650, Route Des Lucioles; F-06921 Sophia-Antipolis Cedex; France, vol. SA WG2, No. Gothenburg, Sweden; Jan. 22, 2018-Jan. 26, 2018, Jan. 26, 2018 (Jan. 26, 2018), XP051390303, retrieved from the internet: URL: http://www.3gpp.org/ftp/tsg%5Fsa/WG2% 5FArch/TSGS2%5F125%5FGothenburg/Docs/ [retrieved on Jan. 26, 2018].

Ericcson: Registration Area and Service Restriction Area in relation to multiple PLMNs, 3GPP Draft; 23501_CR0641R1_5GS_PH1_ (REL-15)_S2-1811274_WAS10242_REGISTRATION Area and Service Restriction Area, 3rd Generation Partnership Project (3GPP), Mobile Competence Centre; 650, Route Des Luc, vol. SA WG2, No. Dongguan, China; Oct. 15, 2018-Oct. 19, 2018, Dec. 4, 2018 (Dec. 4, 2018), XP051562634, Retrieved from the internet: URL:http:// www.3gpp.org/ftp/Meetings%5F3GPP%5FSYNC/SA/Docs/SP% 2D181089%2Ezip [retrieved on Dec. 4, 2018].

International Search Report and Written Opinion of the International Searching Authority directed to related International Patent Application No. PCT/US2020/017068, mailed May 19, 2020, 11 pages.

3GPP TS 23.501 V15.4.0, 3rd Generation Partnership Project; Technical Specification Group Services and System Aspects; System Architecture for the 5G System; Stage 2 (Release 15), Dec. 2018; 236 pages.

3GPP TS 23.502 V15.4.0, 3rd Generation Partnership Project; Technical Specification Group Services and System Aspects; Procedures for the 5G System; Stage 2 (Release 15), Dec. 2018; 346 pages.

\* cited by examiner

ENABLING INTERACTIVE SERVICE FOR CLOUD RENDERING GAMING IN 5G SYSTEMS

CROSS-REFERENCE TO RELATED APPLICATIONS

This application is a U.S. National Phase Entry of International Application No. PCT/US2020/017068, which claims the benefit under 35 U.S.C. § 119 (e) of U.S. Provisional Application No. 62/802,153, filed Feb. 6, 2019, both of which are hereby incorporated by reference in their entireties.

FIELD

Various embodiments generally may relate to the field of wireless communications.

SUMMARY

The present disclosure is directed to systems and methods for providing interactive services to a device. In one example, a method may include determining service authorization information for a device, the service authorization information being associated with an interactive service on a wireless network. The method may also include determining device policies for the device based on the service authorization information. The method may also include transmitting the device policies to the device, wherein the device policies enable the device to select a cloud rendering server for the interactive service.

In another example, the present disclosure is directed to a non-transitory computer-readable medium comprising instructions to cause a computing device, upon execution of the instructions by one or more processors of the electronic device, to perform one or more operations. The operations may include determining service authorization information for a device, the service authorization information being associated with an interactive service on a wireless network. The operations may also include determining device policies for the device based on the service authorization information. The operations may also include transmitting the device policies to the device, wherein the device policies enable the device to select a cloud rendering server for the interactive service.

In another example, the present disclosure is directed to an apparatus having radio front end circuitry, a processor and a memory that stores instructions that, when executed by the processor, cause the processor to determine service authorization information for a device, the service authorization information being associated with an interactive service on a wireless network. The instructions may also cause the processor to determine device policies for the device based on the service authorization information. The instructions may also cause the processor to transmit, using the radio front end circuitry, the device policies to the device, wherein the device policies enable the device to select a cloud rendering server for the interactive service.

In some embodiments, the service authorization includes at least one of the following: an application ID; a list of allowed public land mobile networks (PLMNs); a list of data network names (DNNs) per PLMN; a list of cloud rendering server internet protocol (IP) addresses and port numbers per DNN and PLMN; priority per cloud rendering server; or validity criteria.

In some embodiments, the service authorization comprises the validity criteria, and wherein the device is configured to select a cloud rendering server with a highest priority that satisfies the validity criteria.

In some embodiments, determining the service authorization information comprises determining the service authorization information using a device configuration update procedure.

In some embodiments, the method further includes sending a request to a policy control function (PCF) to trigger the device configuration update procedure.

In some embodiments, the device policies comprise the service authorization information.

In some embodiments, the method further includes determining an update to the service authorization information and transmitting the updated service authorization information to the device, wherein the updated service authorization information causes the device to select a different cloud rendering server for the interactive service.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
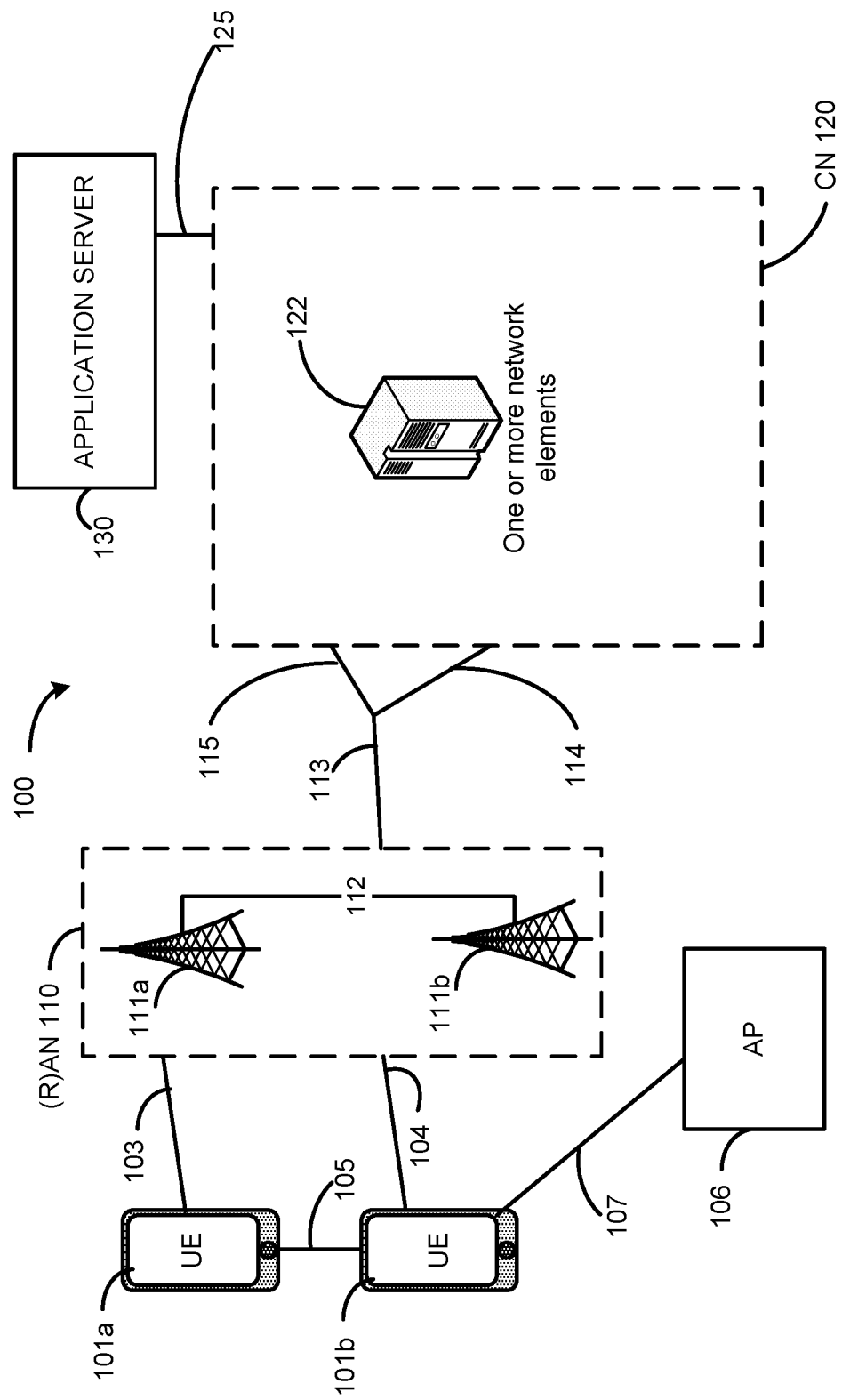
FIG. 1 illustrates an example architecture of a system of a network, according to some embodiments of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

One potential use case for network controlled interactive service in fifth generation (5G) wireless communication networks is cloud rendering game. Cloud gaming, (also known as gaming on demand) is a type of online gaming that allows direct and on-demand video streaming of games onto different computing devices through the use of a thin client. The game is stored, executed, and rendered on a remote server and the video results are streamed directly to the computing device. This allows users to access games without regard to the capability of the user's computing device, as the remote server is responsible for storing, executing, and rendering the game. The controls and button presses from the user's computing device are transmitted to the server, where they are recorded, and the server then sends back the game's response to the input controls. Current 5Gs system lacks the capability to provision interactive services for cloud rendering gaming in efficient and optimal manners.

This disclosure focuses on cloud rendering game to provide interactive services for gamers using user equipment (UE) over the 5G system and provides solutions to resolve the following issues:

Issue 1: The cloud rendering gaming is an on demand service. Efficiently and optimally managing network resources for provisioning the interactive service may require high demanded bandwidth and low latency, and as such, the 5G system may need a mechanism for access control and service authorization.

Issue 2: To meet the stringent key performance indicators (KPIs) for provisioning interactive service in cloud rendering gaming, the usage of Edge computing may be needed as indicated in clause 5.13 in Third Generation Partnership Project (3GPP) TS23.501 (System Architecture for 5G system). For a Cloud Rendering Server as an Application Function (AF), the AF may request to infer a user plane route and steer a particular traffic flow with required quality of service (QoS) to local area data network. However, interactive services may be sensitive to the route changes, and the user may be at the risk of a service interruption and affect the required KPIs. Thus, a mechanism in 5G system may be needed to reduce the frequency or probabilities of route changing caused by load balancing.

Issue 3: For a cloud rendering server, high computing power and resources may be required, and third party service operators may deploy computing/resource load balancing mechanism to balance the load for serving gamers among cloud rendering servers. Currently, 5G systems do not support a mechanism to discover and relocate the cloud rendering server for interactive services.

Issue 4: For the interactive services, the UE transmits, in the uplink, commands that a user has given to control the game (using a remote control or by pressing buttons). This information may normally be sent in small packet size, but may require high reliability and low latency. It is desirable that the 5G core network (5GC) handles the packets containing the commands to control the game.

Currently, 5G systems support cloud rendering gaming for interactive services in a best effort manner, which may induce some potential issues as discussed above. The existing 5G system lacks the capability to provision interactive services for cloud rendering gaming in efficient and optimal manners.

This disclosure provides the following solutions for resolving above mentioned issues.

Solution1: Interactive service subscription and service authorization to support on demand cloud rendering gaming.

Solution2: AF triggered application traffic pattern provisioning as assistant information.

Solution3: AF triggered cloud rendering server relocation due to computing/resource balancing in application domains.

The techniques described herein, provide mechanisms in 5GS to reflect the dynamic traffic activities caused by users using interactive service for cloud rendering gaming.

Solution 1: Subscription and Service Authorization

This solution is aimed at resolving issue 1 and partially issue 3 related to the discovery of the cloud rendering servers.

Figure 13:
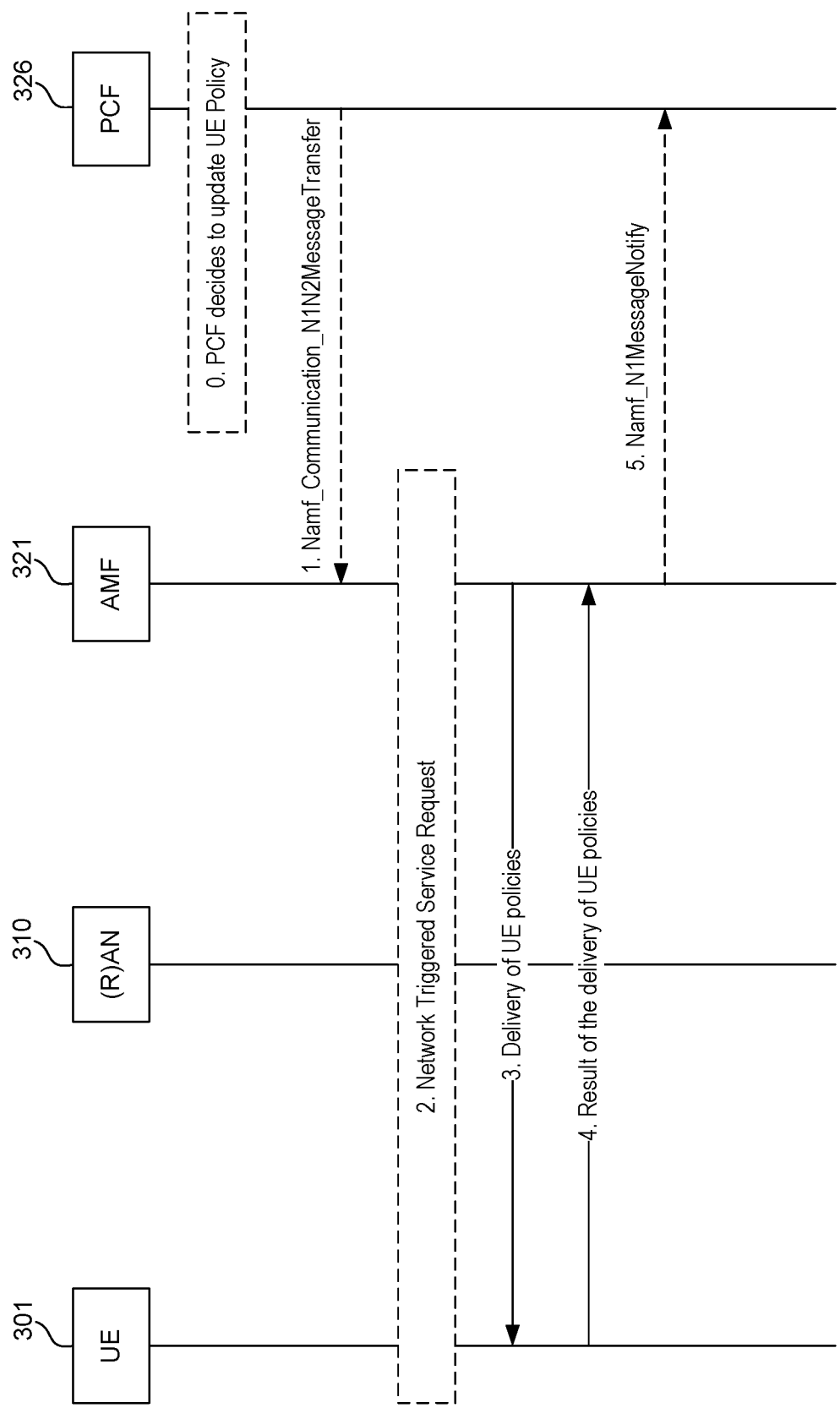
FIG. 13 illustrates a UE configuration update procedure, according to some embodiments of the disclosure.

For a UE, e.g., UE 301 of FIG. 3 discussed in greater detail below, to use cloud rendering gaming in 5GS, the UE 301 may need to have a subscription for interactive services and service authorization for the cloud rendering gaming, whereby the service authorization can be configured by a policy control function (PCF), e.g., PCF 326 of FIG. 3, using a UE configuration update procedure, as shown in FIG. 13 and as indicated in clause 4.2.4.3 of 3GPP TS 23.502. In the UE configuration update procedure shown in FIG. 13, the service authorization may be sent via Namf_Communication_N1N2MessageTransfer message from the PCF 326 to an Access and Mobility Management Function (AMF), e.g., AMF 321 of FIG. 3, which may contain at least one of the following information for cloud rendering gaming authorization:

an application ID;
a list of allowed public land mobile networks (PLMNs);
a list of data network names (DNNs) and, optionally, with
 an of indication of a local area data network (LADN)
 per PLMN;

a list of cloud rendering server internet protocol (IP) addresses and port numbers per DNN and PLMN;
priority per cloud rendering server; or
validity criteria, e.g. service time, allowed service geographical areas, "user's consent agreement."

The authorization information can include more than one application IDs with corresponding configuration information.

Solution 1.1: On Demand Interactive Service for Cloud Rendering Gaming

Following solution 1, an Application Function (AF), e.g., AF 328 of FIG. 3, connected with cloud rendering server may send a request to the PCF 326 directly, or via an network exposure function (NEF), e.g., NEF 323 of FIG. 3 discussed in greater detail below, to trigger the UE configuration update procedure for updating service authorization of the cloud rendering gaming to the UE 301, as illustrated in FIG. 13, whereby the following information may be provided:

application ID;
list of allowed PLMNs;
list of DNNs per PLMN;
list of cloud rendering server IP addresses and port numbers per DNN, PLMN
priority per cloud rendering server; or
validity criteria, e.g. service time, allowed service geographical areas, "user's consent agreement."

Based on the received UE configuration information, the UE 301 may select a cloud rendering server with the highest priority that satisfies all validity criteria.

The PCF 326 may provide multiple policy sections separately to the AMF 321 and then the AMF 321 may use the UE configuration update procedure for transparent UE policies delivery procedure, as shown in FIG. 13, to deliver the policies to the UE 301, as defined in 3GPP TS 23.502 clause 4.2.4.3 and clause 4.16.

Solution 2

This solution is aimed at resolving issue 2.

According to the content of the cloud rendering gaming and the progress of the game, short-term traffic patterns may cause different level of traffic loads in the user plane. This solution proposes to provide short-term information of traffic activities to the 5G control as assistant information for network resource management and quality of service (QoS) control.

The short-term estimated information is the traffic patterns per application which may include but is not limited to:
application ID;
application type description: cloud rendering gaming, e.g. video streaming, file streaming; or
traffic patterns parameters per application;
traffic pattern duration;
time frame size, e.g. 10 secs, 30 secs, 1 min, 5 mins, etc;
interactive downlink traffic packet arrival rate, packet size, and volume per time frame (traffic rate) (for video streaming the real-time gaming scene); or
interactive uplink traffic packet arrival rate, packet size, and volume per time frame (traffic rate) (for commands and control).

The traffic pattern information may be provided with conditions of geographical area per UE, IP flow, or User group identified by Group ID known by the network.

The followings are the procedures that can be used by the AF 328 to provide assistant information related to traffic pattern.

Solution 2.1: AF Requests for Traffic Steering Towards Local Edge Computing Network This solution allows the 5G network to manage user plane traffics better and reduce the chance to reselect user plane route.

Figure 14:
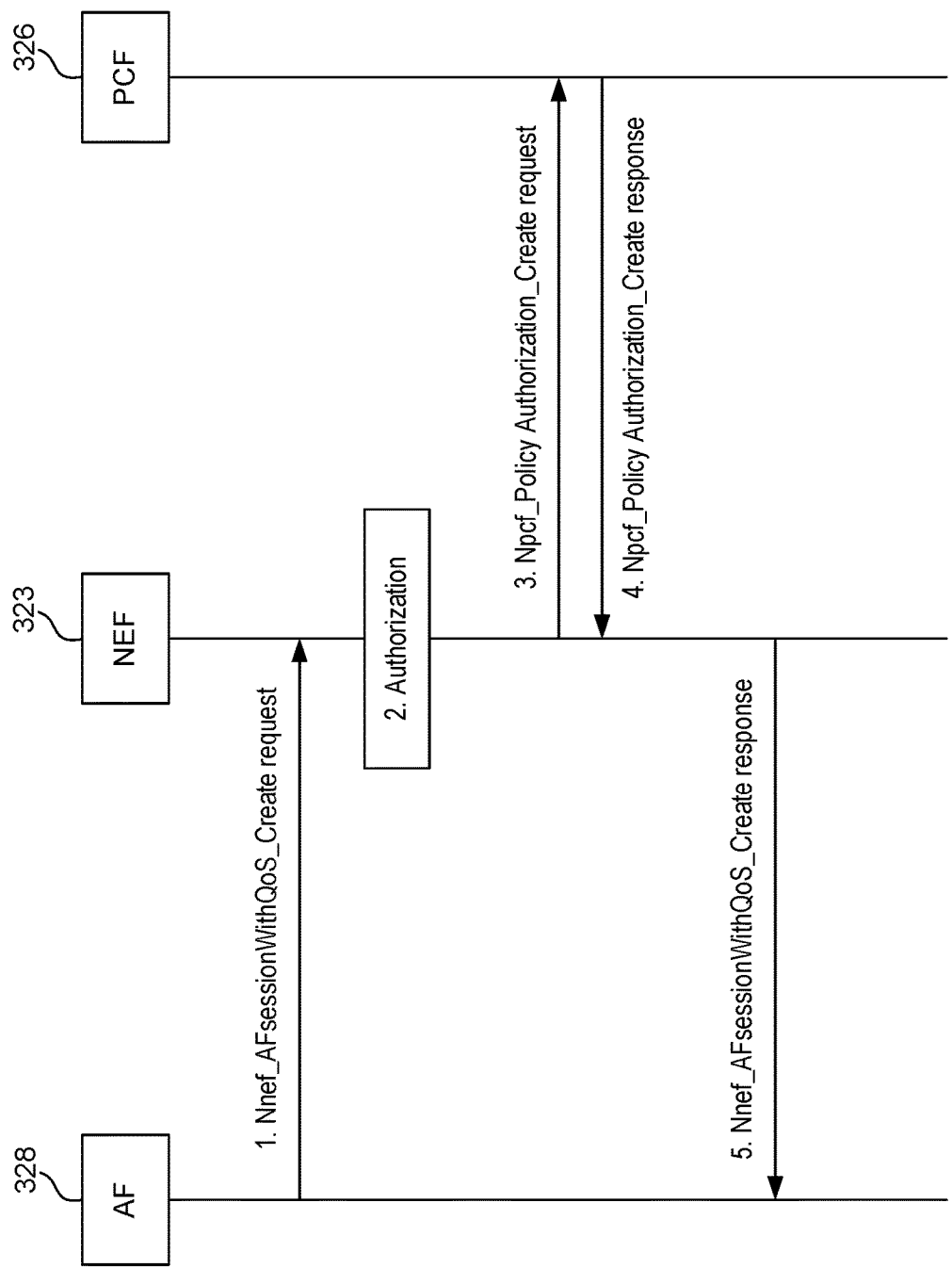
FIG. 14 illustrates a process for requesting quality of service (QoS) control procedure for a particular traffic flow, according to some embodiments of the disclosure.

Following solution 2, based on Application Function influence on traffic routing, clause 5.6.7 of TS 23.501 and clause 5.6.7 of 3GPP TS 23.501. As illustrated in FIG. 14, the AF 328 may send a request message that further includes the traffic pattern as stated in solution 2. The traffic pattern may be provided per Traffic Description and target UE(s), i.e. per application. The traffic pattern may be used for steering user plane route and reselection of User Plane Function (UPF), e.g., UPF 302 of FIG. 3 discussed in greater detail below.

The following list is existing information provided by the AF 328 to request traffic steering as indicated at clause 5.6.7:
traffic description: defines the target traffic to be influenced, represented by the combination of DNN and optionally S-NSSAI, and application identifier or traffic filtering information;
target UE identifier(s);
AF transaction identifier;
potential locations of applications;
spatial validity condition;
traffic routing requirements;
application relocation possibility;
temporal validity condition; or
information on AF subscription to corresponding Session Management Function (SMF) events.

The above information is forwarded to the SMF, e.g., SMF 325 of FIG. 3 discussed in greater detail below, for the consideration of the UPF 302 selection/reselection. The following list includes existing information considered as indicated at clause 6.3.3.2-for SMF provisioning of available UPF(s):
UPF related info:
UPF's dynamic load, UPF's relative static capacity among UPFs supporting the same DNN, UPF location available at the SMF, capability of the UPF and the functionality required for the particular UE session: An appropriate UPF can be selected by matching the functionality and features required for an UE.
DNAI related info:
DNAI as included in the PCC Rules and described in clause 5.6.7, information regarding user plane termination(s) corresponding to DNAI(s), information related to user plane topology and user plane terminations, that may be deduced from
local operator policies.
UE related info:
UE location information, UE subscription profile in UDM, access technology being used by the UE.
PDU Session related info:
Data Network Name (DNN), S-NSSAI, SSC mode selected for the PDU Session, PDU Session Type (i.e. IPv4, IPv6, IPv4v6, Ethernet Type or Unstructured Type) and if applicable, the static IP address/prefix.
AN related info:
AN-provided identities (e.g. CellID, TAI), available UPF(s) and DNAI(s), Information regarding the N3 User Plane termination(s) of the AN serving the UE. This may be deduced from AN-provided identities (e.g. CellID, TAI);

Information regarding the user plane interfaces of UPF(s). This information may be acquired by the SMF using N4; and Information regarding the N9 User Plane termination(s) of UPF(s) if needed.

Solution 2.2: AF Requests for QoS Control for a Particular Traffic Flows

Following solution 2, based on AF session set up for required QoS as indicated in clause 4.15.6.6 in 3GPP TS23.502, as illustrated in FIG. 14, the AF 328 may send Nnef_AFsessionWithQoS_Create request message and include traffic pattern information as stated in solution 2. The traffic pattern may be provided per description of the application flows, i.e. per application and IP flows.

Solution 2.3: External Parameters Provisioning

Following solution 2, based on AF session set up for required QoS, the AF 328 may send Nnef_AFsessionWith-QoS_Create request message and include traffic pattern information as stated in solution 2. The traffic pattern is provided per Description of the application flows, i.e. per application and IP flows.

Figure 15:
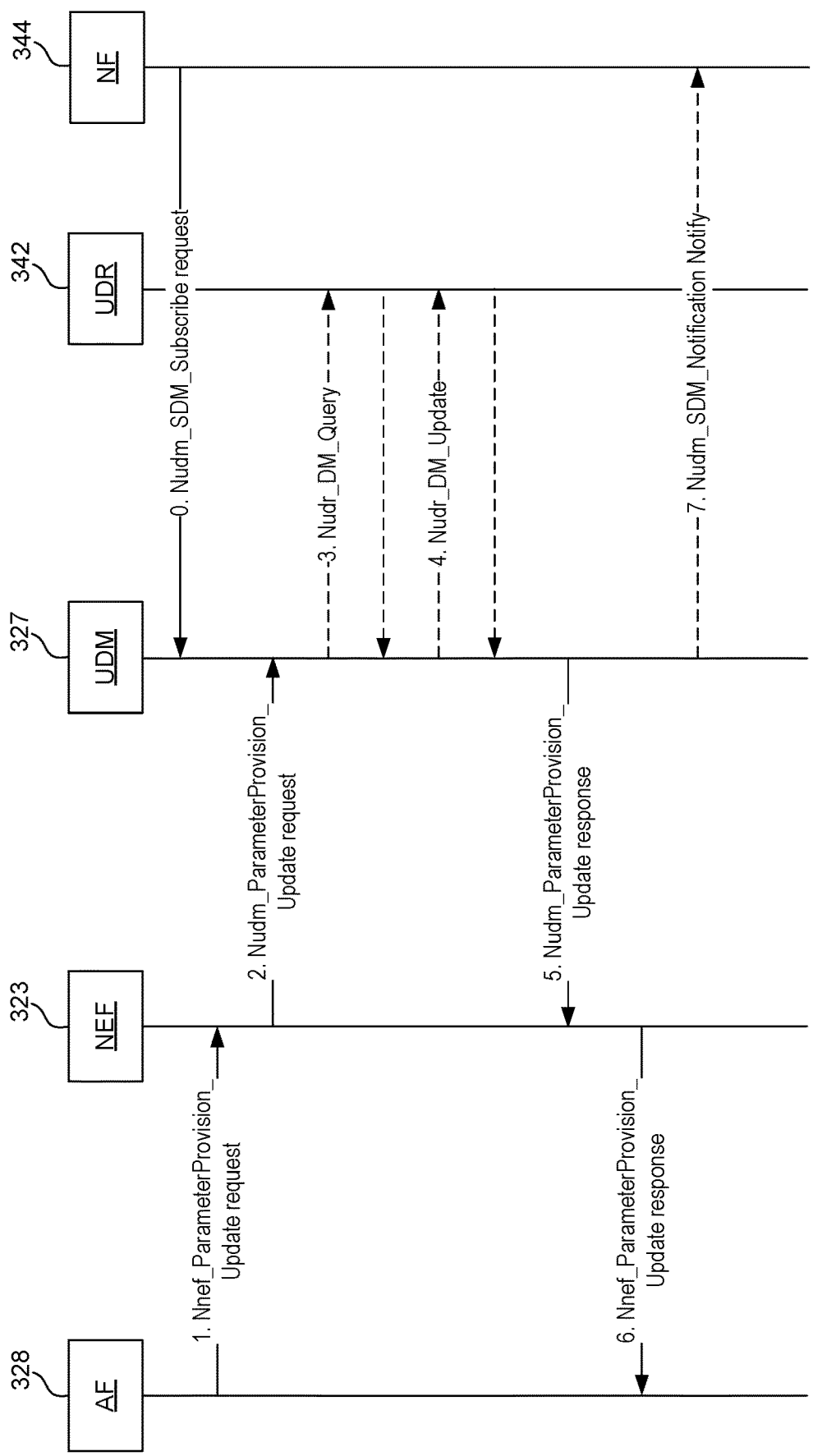
FIG. 15 illustrates an NEF provisioning procedure, according to some embodiments of the disclosure.

Following solution 2, based on the AF requested NEF provisioning capability, the expected traffic patterns information as stated in solution 2 may be provided to 5G network functions, as illustrated in FIG. 15.

In this solution, the expected traffic pattern information may provide traffic related characteristics for the foreseen behavior of a UE 301 or a group of UEs 301. Sets of these parameters may be provided via the NEF 323 to be stored as part of the subscriber data.

Solution 3

This solution is aimed at resolving issue 3 related to application server relocation.

There are following two occasions that AF 328 may need to request for the changes of the cloud rendering server:

1) When the AF 328 adds more new cloud rendering servers for applications and needs to update information to the 5G system including 5G control and the UE 301.
2) When the AF 328 needs to change the AF session with the cloud rendering server to be relocated. This may be happened when computing power/resource surge and the AF 328 needs to perform load balancing among cloud rendering application servers.

Solution 3.1: External Parameters Provisioning

To resolve case 1, based on procedure of AF requested NEF provisioning capability, as illustrated in FIG. 15, the following cloud rendering server information may be provided to 5G network functions, as indicated in FIG. 15, as Nnef_ParameterProvision_update request/response operations:
 application ID;
 list of allowed PLMNs;
 list of DNNs per PLMN;
 list of cloud rendering server IP addresses and port numbers per DNN, PLMN
 priority per cloud rendering server; or
 validity criteria, e.g. service time, allowed service geographical areas, "user's consent agreement."

In addition, the following procedure may be followed after the external parameters provisioning procedure:

Step 1: if the PCF 326 has subscribed to the notification event from the Unified Data Management/Unified Data Repository (UDM/UDR), e.g., UDM 327 of FIG. 3 discussed in greater detail below, for the changes of authorization information of application parameters, the PCF gets the notification information.

Step 2: the PCF 326 determines to trigger UE configuration update procedure, as illustrated in FIG. 13, indicated in TS 23.502 clause 4.2.4.3 and clause 4.16, to update the information of the cloud rendering servers for the associated application.

Step 3: Based on the received UE configuration information, the UE 301 selects a cloud rendering server with the highest priority that satisfies all validity criteria.

Solution 3.2: Application Server Relocation Via AF Requested App Policy Update Procedure To resolve case 2 due to computing/resource load balancing and monitoring reports received from the 5G network, the AF 328 may need to relocate the cloud rendering server. This solution proposes a mechanism to allow AF 328 to update information to the 5GC about cloud rendering server relocation for a UE 301 or a group of UEs 301 identified by a group ID or subgroup ID.

Specifically, in the request message, an indication is added to notify the activation condition for the policy. For example, an indication can be added to represent immediate activation as soon as the policy is updated. For example, an indication can be added with a timer to represent that the activation takes effect when the timer is expired. For example, an indication can be added with the condition to activate the policy when the UE configuration is updated successfully. Depending on the operator's configuration, the AF may request for policy changes directly to PCF 326, or via NEF 323 when the AF 328 is not authorized to directly access the PCF 326.

Figure 16:
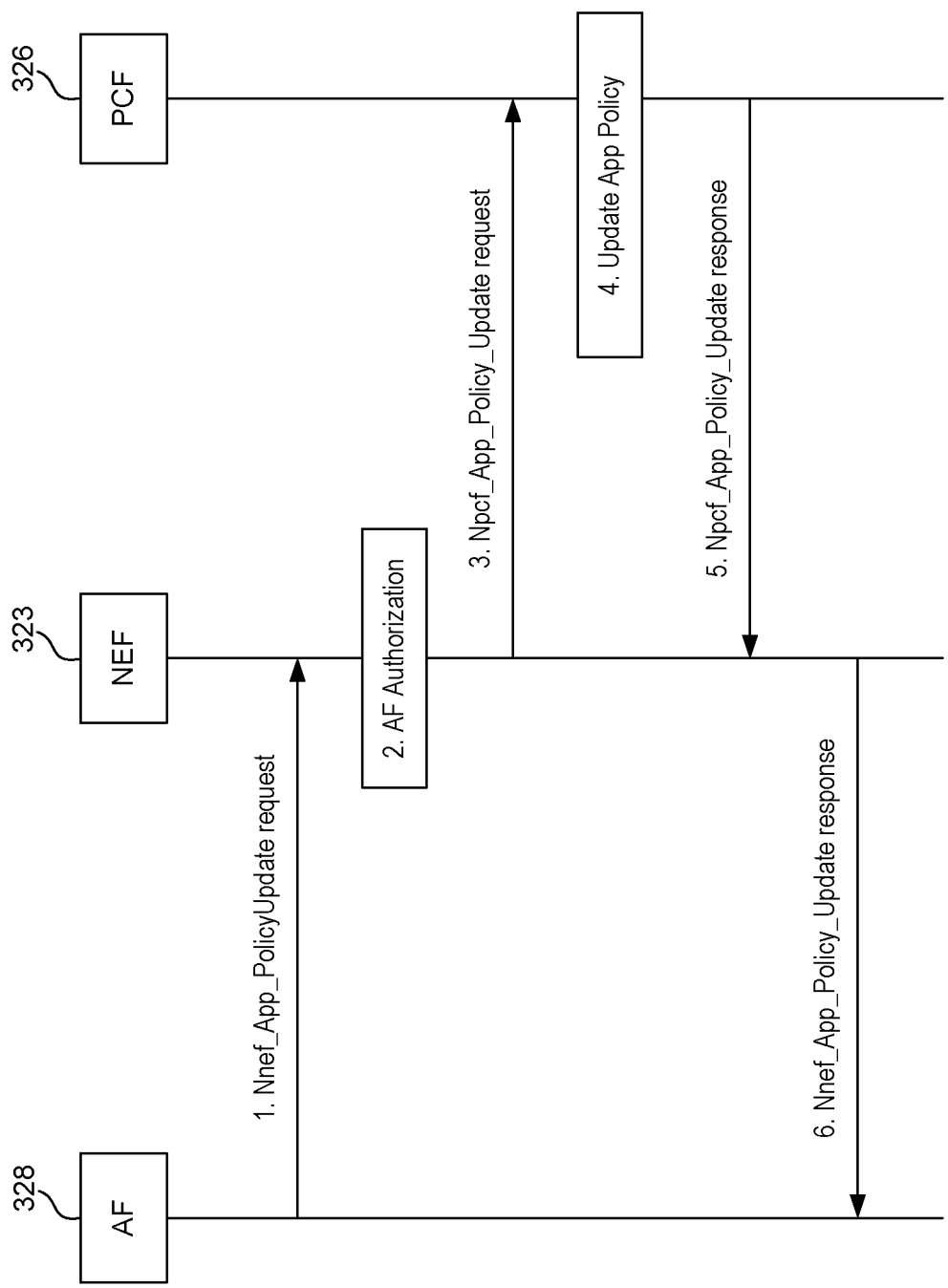
FIG. 16 illustrates a process for requesting an application policy update, according to some embodiments of the disclosure.

As illustrated in FIG. 16, at step 1, the AF 328 may request for application policy update service authorization by sending a Nnef_App_Policy_Update Request (AF Identifier, Generic Public Subscription Identifier (GPSI)/External Group Identifier of the UE, external Application Identifiers, Application Policies for each Application Identifier) message to the NEF 323, whereby the Application Policy information includes:
 indication for policy activation/deactivation per application
 parameters of cloud rendering service per application that further includes:
  application ID;
  list of allowed PLMNs;
  list of DNNs per PLMN;
  list of cloud rendering server IP addresses and port numbers per DNN, PLMN
  priority per cloud rendering server; or
  validity criteria, e.g. service time, allowed service geographical areas, "user's consent agreement."

In this step, the parameters may be indicated with the addition, remove, update. The full set of the configuration may be included or only the difference of the configuration is needed to send as parameters instead of providing full set of parameters.

In response to receiving the Nnef_App_Policy_Update Request, at step 2, the NEF 323 may authorize the AF 328 to request authorization for application policy update together with the AF Identifier. If the authorization is not granted, this may be omitted and the NEF 323 may reply to the AF 328 with a result value indicating that the authorization failed. If the authorization is granted, the NEF 323 may allocate a transaction reference ID to identify the follow up messages regarding to the request. Based on operator configuration, the NEF 323 may skip this step, and in this case, the authorization may be performed by the PCF 326 in step 3.

At step 3, the NEF 323 may send a Npcf_App_Policy_Update request message (Application Identifier(s), Application policy information for each Application Identifier, SUPI) to the PCF 326. The NEF 323 may also query for the translation of GPSI/External Group Identifier of the UE to Subscription Permanent Identifier (SUPI) of the UE 301.

At step 4, the PCF 326 may determine whether the request is allowed. If yes, the PCF 326 may continue to create the list of application policies into the PCF326 based on the operator's configured policies for each requested application ID and respond to NEF 323.

At step 5, the PCF 326 may send a Npcf_App_Policy_Update Response message (Application Identifier(s), Results) message to the NEF that indicates the results. If any of the updates for application policy fails, cause is provided per Application ID, e.g. policy suspend, policy expiration, policy unavailable, etc.

At step 6, the NEF 323 may send a Nnef_App_Policy_Update Response (Transaction Reference ID, Results) message to the AF 328 to provide the feedback of the result for Nnef_App_Policy_Update Request. The transaction reference ID may be used by the AF 328 to provide the follow up information regarding to the request for the Application Policy Update procedure.

The AF 328 may request to follow the following monitoring events [T523.502]:
Loss of Connectivity
UE reachability
Location Reporting
Change of SUPI-PEI association
Roaming status
Communication failure
Availability after DNN failure
Number of UEs present in a geographical area Also, AF 328 can request for Notification of Change of user plane route (for the DNAI). [T523.501]

Solution 3.3

Figure 17:
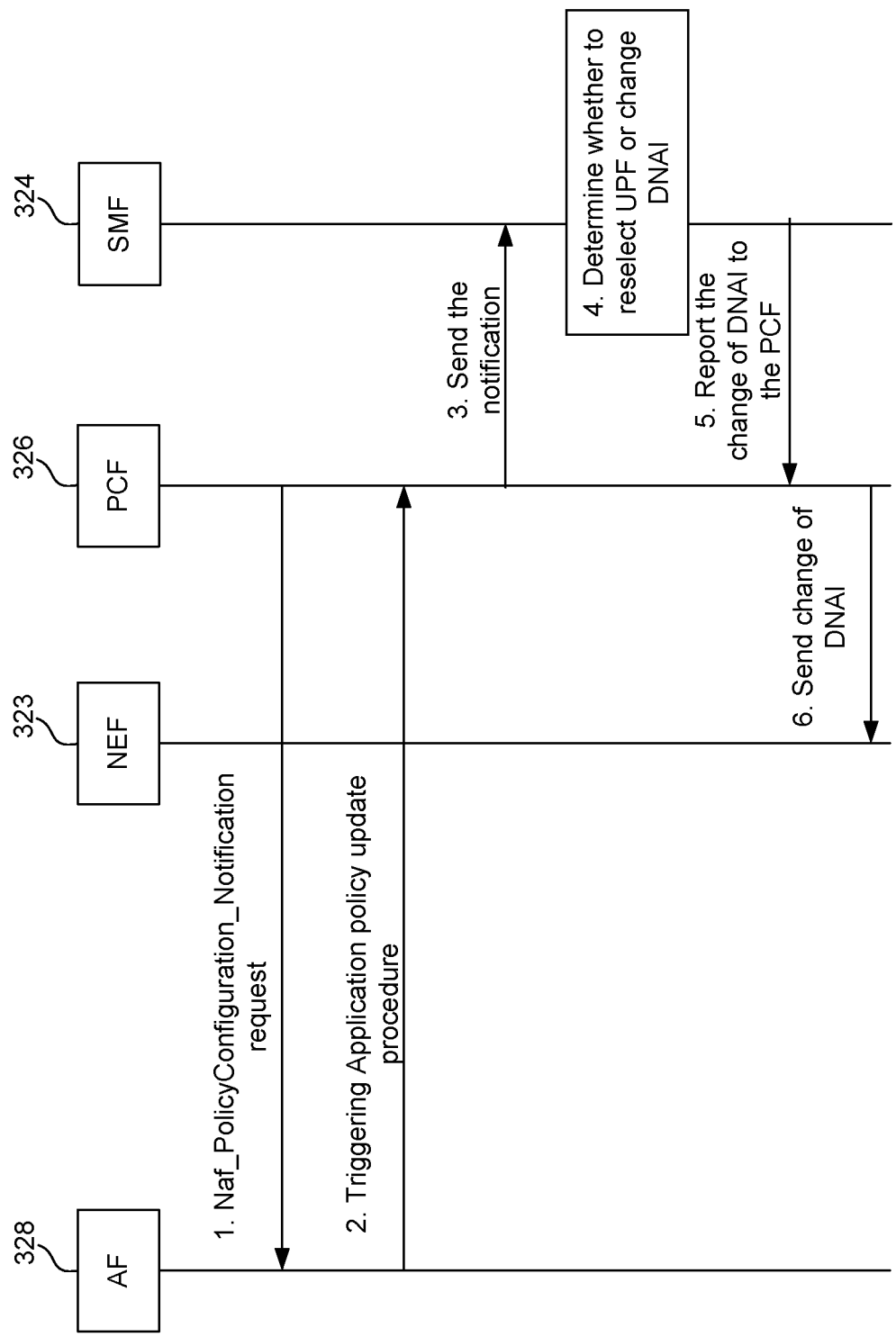
FIG. 17 illustrates another process for requesting an application policy update, according to some embodiments of the disclosure.

Following solution 3.2, whereby the AF 328 triggers Application Policy Update procedure, as illustrated in FIG. 17, due to the occurring of a notification event, e.g. cloud rendering server configuration changes, in which the notification event is subscribed to by the PCF 326 to request application event notification from AF 328 via an application server information updates procedure. Depending on the operator's configuration, the AF 328 can request for policy changes directly from the PCF 326, or via the NEF 323, if the AF 328 is not authorized to directly access the PCF 326. The procedure can be as follows:

at step 1, the PCF 326 may request the AF 328 to configure notification events for application policy updates, e.g. using Naf_PolicyConfiguration_Notification request, indicating the application identifiers for policy configuration notification for a UE 301;

at step 2, when detecting the occurring of the notification event, the AF 328 may send a notification to the PCF 326 triggering the application policy update procedure as stated in Solution 3.2;

at step 3, the PCF 326 may send the notification to the SMF 324;

at step 4, the SMF 324 may determine whether to reselect a UPF 302 or change a DNAI, and if yes, the SMF 324 may reconfigure the UPF 302;

at step 5, the SMF 324 may report the change of DNAI to the PCF 326; and at step 6, the PCF 326 may reply to AF 328 for the change of DNAI.

Solution 3.4

Following solution 3.2 or 3.3, the following procedure may be followed after the PCF 326 receives the updates of application policies:

the PCF 326 may determine whether to trigger the UE configuration update procedure, as illustrated in FIG. 13, indicated in TS 23.502 clause 4.2.4.3 and clause 4.16, to update the information of the cloud rendering servers for the associated application.

based on the received UE configuration information, the UE 301 may re-select a cloud rendering server with the highest priority that satisfies all validity criteria.

Solution 3.5

Step 1: The AF 328 may send a request to the PCF 326 or via the NEF 323, in which the request message may include the information for relocation of cloud rendering server:
IP address
A list of traffic type and corresponding port The request message includes also an indication, e.g. active policy, to ask PCF 326 to directly trigger the UE configuration update procedure and request the UE 301 to use the new UE configuration parameters.

Step 2: with the indication of active policy, the PCF 326 may directly trigger the UE configuration update procedure to forward the requested relocation information, i.e. active policy indication, IP address, a list of traffic types and corresponding port, etc. to the UE 301.

Step 3: with the active policy indication, the UE 301 re-selects the cloud rendering server and applies the configuration of traffic types and the corresponding port, provided by the PCF 326.

Solution 4

This solution is used to resolve issue 4. For the interactive services, the UE 301 may need to transmit, in the uplink, the commands that a user has given to control the game (using remote control or pressing buttons). This information is normally with small packet size but requires high reliability and low latency.

The UE 301 may mark the packet containing the commands and control information in the uplink. When establishing the PDU session, the UE 301 may need to indicate to the SMF 324 to enable per-packet URLLC (ultra reliability and low latency) handling for the interactive game. Based on the indication, the SMF 324 may configure the UPF 302 with the indication of per-packet URLLC handling. The UPF 302 may detect the packet with URLLC marking and deliver the packet with high priority, and may duplicate the packets to enhance the reliability and low latency.

As discussed, this disclosure is directed to cloud rendering gaming and providing interactive services for gamers using user equipment (UE) over 5G networks. The disclosure provides solutions to resolve issues related to access control and service authorization, route changes caused by load balancing, the relocation of cloud rendering servers, and handling packets from user devices containing the commands to control the game. For example and as discussed further below, this disclosure provides for: an interactive service subscription and service authorization to support on demand cloud rendering gaming; using application traffic pattern provisioning as assistant information; managing cloud rendering server relocation due to computing/resource balancing in application domains; and prioritized packet handling for packets from user devices containing the commands to control the game.

In some embodiments, the processes described herein may be performed using a system, such as the system 300 shown in FIG. 3, which is described in greater detail below. In some embodiments, the system 300 may include: a UE 301; an AUSF 322; an AMF 321; a SMF 324; a NEF 323; a PCF 326; a NRF 325; a UDM 327; an AF 328; a UPF 302; and a NSSF 329.

In some embodiments, for the UE 301 to use cloud rendering gaming, the UE 301 may have a subscription for interactive services and a service authorization. The service authorization may be generated by the PCF 326 using a UE configuration update procedure. For example, when the PCF 326 wants to change or provide new device policies to the UE 301, the PCF 326 may initiate the UE configuration update procedure, as illustrated in FIG. 13. In some embodiments, at step 1, the UE configuration update procedure may include transmitting a first message having, for example, access and mobility related information or a UE policy container, e.g., UE access and protocol data unit (PDU) session selection related information, or both, from the PCF 326 to the AMF 321. In some embodiments, the PCF 326 may transmit an update of the access and mobility related information or the UE policy container to the AMF 321.

In response to receiving the first message, at step 2, the AMF 321 may trigger a network service request, and if the UE 301 is not reachable, the AMF 321 may report to the PCF 326 that the UE policy container could not be delivered to the UE 301. At step 3, if the UE 301 is reachable, the AMF 321 may transfer the UE policy container to the UE 301. In some embodiments, the UE policy container may include a list of policies to notify the UE 301 that one or more policies were added, removed, or modified. At step 4, in response to UE policy container, the UE 301 may perform the PSI operations and send a result back to the AMF 321. In turn, at step 5, the AMF 321 may transfer the result to the PCF 326. For example, in some embodiments, the PCF 326 may subscribe to be notified of the reception of the UE policy container, and as such, the AMF 321 may forward the response from the UE 301 to the PCF 326 using a return message that includes information on a policy control request trigger condition that has been met. In response, the PCF 326 may confirm the reception of the return message to the AMF 321.

In some embodiments, the PCF 326 may provide multiple policy sections separately to the AMF 321 and, in turn, the AMF 321 may use the UE configuration update procedure to deliver the policies to the UE 301. For example, in some embodiments, the service authorization may be sent in the first message transmitted from the PCF 326 to the AMF 321. The service authorization may include at least one of the following: an application ID; a list of allowed public land mobile networks (PLMNs); a list of data network names (DNNs) and, optionally, with an of indication of a local area data network (LADN) per PLMN; a list of cloud rendering server internet protocol (IP) addresses and port numbers per DNN and PLMN; priority per cloud rendering server; or validity criteria, e.g. service time, allowed service geographical areas, "user's consent agreement." In some embodiments, the service authorization may include more than one application ID with corresponding configuration information. In some embodiments, the AF 328 may be connected with a cloud rendering server and may send a request to trigger the UE configuration update procedure. Based on the received UE configuration information, the UE 301 may select a cloud rendering server with the highest priority that satisfies the validity criteria.

In some instances, the content and progress of the cloud rendering game may affect short-term traffic patterns that may cause different level of traffic loads in a user plane. To resolve this, in some embodiments, short-term information of traffic activities may be provided as assistant information for network resource management and QoS control. The short-term information may include traffic patterns per application which may include, but is not limited to: an application ID; an application type description (e.g., cloud rendering gaming, video streaming, file streaming); and traffic patterns parameters per application. The traffic patterns parameters per application may include: traffic pattern duration; time frame size (e.g. 10 secs, 30 secs, 1 min, 5 mins, etc.); interactive downlink traffic packet arrival rate, packet size, and volume per time frame (traffic rate), and for video streaming, the real-time gaming scene; and interactive uplink traffic packet arrival rate, packet size, and volume per time frame for commands and control. In some embodiments, the traffic pattern information may be provided with conditions of geographical area per UE, IP flow, or user group identified by a group ID known by the network. In some embodiments, the AF 328 may be configured to provide the short-term information related to the traffic patterns, which allows the 5G network to manage user plane traffic better and reduce the chance to reselect user plane route.

In some embodiments, the AF 328 may send requests to influence SMF routing decisions for user plane traffic of PDU Sessions. For example, the AF 328 may influence user plane function (UPF) selection/reselection, and allow routing of user traffic to a local access (identified by a DNAI) to a data network. The AF 328 may also include a request to subscribe to SMF events. In some embodiments, the AF 328 may send a request message to further include the traffic pattern information. In some embodiments, the traffic pattern information may be provided on a per application basis based on the traffic description and target UE. As such, the traffic pattern information may be used for steering user plane routing and the (re)selection of a user plane function (UPF). In some embodiments, the traffic pattern information may include: a traffic description (e.g., information defining target traffic to be influenced, represented by the combination of DNN, an application identifier or traffic filtering information, and optionally, single—network slice selection assistance information (S-NSSAI); target UE identifier(s); AF transaction identifier(s); potential locations of applications; spatial validity condition(s); traffic routing requirements; application relocation possibility(ies); temporal validity condition(s); and/or information on AF subscription(s) to corresponding SMF events.

In some embodiments, information provided by the AF 328 may be forwarded to the SMF 324 for the consideration of the UPF selection/reselection. For example, the information forwarded to the SMF 324 may include: UPF related info (e.g., a UPF's dynamic load, a UPF's relative static capacity among UPFs supporting the same DNN, UPF location available at the SMF, capability of the UPF and the functionality required for the particular UE session, where an appropriate UPF may be selected by matching the functionality and features required for an UE); data network access identifier (DNAI) information (e.g., DNAI as included in policy and charging control (PCC) rules, information regarding user plane termination(s) corresponding to DNAI(s), information related to user plane topology and user plane terminations that may be deduced from local operator policies; UE related info (e.g., UE location information, UE subscription profile in unified data management (UDM), access technology being used by the UE); protocol data unit (PDU) session related info (e.g., DNN, S-NSSAI, session and service continuity (SSC) mode selected for the PDU session, PDU session type (i.e. IPv4, IPv6, IPv4v6, Ethernet Type or Unstructured Type) and if applicable, a static IP address/prefix; access network (AN) related info (e.g., AN-provided identities (e.g. CellID, TAI), available UPF(s) and DNAI(s), information regarding the user plane termination(s) of the AN serving the UE, which may be deduced from AN-provided identities (e.g. CellID, TAI); information regarding the user plane interface(s) of the UPF(s), which may be acquired by the SMF using N4; or information related to the user plane termination(s) of UPF (s).

In some embodiments, the AF 328 may request quality of service (QoS) control procedure for a particular traffic flow, as illustrated in FIG. 14. For example, at step 1, the AF 328 may send a message to the NEF 323 and include the traffic pattern information. In some embodiments, at step 2, the NEF 323 may authorize the AF request and may apply policies to control the overall amount of pre-defined QoS authorized for the AF 328. In some embodiments, at step 3, the NEF 323 may interact with the PCF 326 by sending request to the PCF 326 for authorization that includes, for example, IP filter information, sponsored data connectivity information, reference ID if received from the AF 328, and sponsoring status if received from the AF 328. In response to receiving the request, at step 4, the PCF 326 may derive the required QoS based on the information and determine whether the QoS is allowed according to a PCF configuration for this AF 328, and notifies the result to the NEF 323. The PCF 326 may determine whether the request is allowed and notifies the NEF 323 if the request is not authorized. In some embodiments, at step 5, the NEF 323 may send response message to the AF 328 indicating whether the request is granted or denied. In some embodiments, the traffic pattern information may provide traffic related characteristics for the foreseen behavior of a UE 301 or a group of UEs 301. In some embodiments, sets of the pattern information may be stored as part of subscriber data.

In some embodiments, the AF 328 may request changes when the AF 328 adds a new cloud rendering server or when the AF 328 changes the AF session with the cloud rendering server to be relocated, e.g., when computing power/resource surge occurs and the AF 328 performs load balancing among cloud rendering servers. To resolve the first instance, an NEF provisioning procedure may be executed, as illustrated in FIG. 15. For example, at step 1, the AF 328 may provide one or more parameter(s) to be updated to the NEF 323. When the AF 328 is authorized by the NEF 323 to provision the parameters, at step 2, the NEF 323 may send a request to the UDM 327 to update and store the provisioned parameters as part of subscriber data. In turn, at step 3 and 4, the UDM 327 may obtain corresponding subscriber information in order to validate required data updates and authorize these changes for this subscriber for the corresponding AF 328. When the AF 328 is authorized by the UDM 327 to provision the parameters for this subscriber, the UDM 327 requests to update and store the provisioned parameters as part of the subscriber data. In some embodiments, at step 5, the UDM 327 may respond to the NEF 323 with the provisioned data as part of the subscription data. In some embodiments, the provisioned data may include: an application ID; a list of allowed PLMNs; a list of DNNs with an indication of LADN per PLMN; a list of cloud rendering server IP addresses and port numbers per DNN and PLMN; priority per cloud rendering server; and/or validity criteria, e.g. service time, allowed service geographical areas, "user's consent agreement."

In some embodiments, after the external parameters provisioning procedure is executed, when the PCF 326 has subscribed to a notification event from the UDM 327 and/or the UDR for the changes of authorization information of application parameters, at step 6, the PCF 326 may receive a notification indicating changes to the provisioned data. In response, the PCF 326 may trigger the UE Configuration Update procedure, as illustrated in FIG. 13, to update the information of the cloud rendering servers for the associated application. And, based on the received configuration information, the UE 301 may select a cloud rendering server with the highest priority that satisfies all validity criteria.

To resolve the second scenario, the AF 328 may relocate the cloud rendering server. For example, the AF 328 may provide updated information to the 5G network about cloud rendering server relocation for a UE 301 or a group of UEs 301 identified by a group ID or subgroup ID. For example, in a policy update request message, the AF 328 may add an indication to notify the activation condition for the policy. In some embodiments, the indication may be added to represent immediate activation as soon as the policy is updated. In some embodiments, the indication may be added with a timer to represent that the activation takes effect when the timer is expired. In some embodiments, the indication may be added with the condition to activate the policy when the UE configuration is updated successfully. In some embodiments, the AF 328 may request the policy changes via NEF 323 when the AF 328 is not authorized to directly access the PCF 326. In some embodiments, the AF 328 may be authorized to directly access the PCF 326.

In some embodiments, as illustrated in FIG. 16, at step 1, the AF 328 may request an application policy update by sending a message to the NEF 323. The request may include an AF identifier, a generic public subscription identifier (GPSI)/external group identifier of the UE, external application identifiers, and/or application policies for each application identifier. In some embodiments, the application policy may include an indication for policy activation/deactivation per application and/or parameters of cloud rendering service per application, which may include: a list of allowed PLMNs; a list of DNNs with indication of LADN per PLMN; a list of cloud rendering server IP addresses and port numbers per DNN and PLMN; a priority per cloud rendering server; and/or validity criteria, e.g. service time, allowed service geographical areas, "user's consent agreement. "In some embodiments, the parameters may be indicated with a status, such as addition, remove, or update. In some embodiments, the full set of the configuration may be included or the difference of the configuration may be transmitted instead of providing the full set of parameters.

In response to receiving the request from the AF 328, at step 2, the NEF 323 may authorize the AF 328 to request authorization for the application policy update together with the AF Identifier. When the authorization is denied, the NEF 323 may respond to the AF 328 indicating such. When the authorization is granted, the NEF 323 may allocate a transaction reference ID to identify follow up messages related to the request. In some embodiments, the PCF 326 may perform the authorization. In some embodiments, at step 3, the NEF 323 may send an update request message to the PCF 326. In some embodiments, the NEF 323 may query for a translation of the GPSI/external group identifier of the UE to a subscription permanent identifier (SUPI) of the UE.

In some embodiments, at step 4, the PCF 326 may determine whether the request is allowed. If yes, the PCF 326 creates a list of application policies based on policies for each requested application ID and respond to NEF 323 accordingly. That is, at step 5, the PCF 326 may send a message to the NEF 323 indicating results of the authorization, and when any of the updates for application policy fails, the PCF 326 includes information indicating why, e.g. policy suspend, policy expiration, policy unavailable, etc., for each application ID that was not authorized. In some embodiments, in response to receiving the results from the PCF 326, at step 6, the NEF 323 forwards the results to the AF 328. In some embodiments, the transaction reference ID may be used by the AF 328 to provide follow up information regarding to the request for the application policy update procedure. In some embodiments, the AF 328 may request to follow one or more of the following monitoring events: loss of connectivity; UE reachability; location reporting; change of SUPI-PEI association; roaming status; communication failure; availability after DNN failure; and number of UEs present in a geographical area. In some embodiments, the AF 328 may request for notification of changes to the user plane route for the DNAI.

In some embodiments, the AF 328 may trigger the application policy update procedure due to the occurrence of a notification event, e.g. cloud rendering server configuration changes. In some embodiments, as described in FIG. 17, at step 1, the PCF 326 may request to receive event notifications from the AF 328. For example, the PCF 326 may request that the AF 328 to configure notification events for application policy updates. At step 2, when detecting the occurrence of the notification event, the AF 328 may send a notification via triggering an application policy update procedure. At step 3, the PCF 326 may send the notification to the SMF 324, and at step 4, the SMF 324 determine whether to reselect a UPF or change a DNAI. At step 5, the SMF 324 may notify the PCF 326 of any changes, e.g., reconfiguration of the UPF or the change of DNAI, and in response, at step 6, the PCF 326 may notify the AF 328 of the change(s).

In some embodiments, after the PCF 326 receives any updates of application policies, the PCF 326 may determines to trigger the UE configuration update procedure, as described herein, to update the information of the cloud rendering servers for the associated application. Based on the received UE configuration information, the UE 301 may then re-selects a cloud rendering server with the highest priority that satisfies all validity criteria.

In some embodiments, in response to the relocation of cloud rendering server, the AF 328 may send a request to the PCF 326 director or via the NEF 323. The request may include the information for relocation of cloud rendering server including an IP address and a list of traffic types and corresponding ports. In some embodiments, the request may also include an indication of an active policy of the UE 301, a request PCF 326 to trigger the UE configuration update procedure, and a request that the UE 301 use the new UE configuration parameters. In some embodiments, the PCF 326 may trigger UE configuration update procedure in order to forward the relocation information, i.e. active policy indication, IP address, a list of traffic types and corresponding port, etc. to the UE 301. In response to receiving the relocation information, the UE 301 may re-selects the cloud rendering server and applies the configuration of traffic types and the corresponding port.

In some embodiments, for the interactive services, the UE 301 may transmit the commands that a user has given to control the game, e.g., using a remote control or pressing buttons. This information may be transmitted in small packet size, but still requires high reliability and low latency. To ensure that the commands are transmitting with high reliability and low latency, the UE 301 may mark the packet containing the commands and control information. That is, when establishing the PDU session, the UE 301 may indicate to the SMF 324 to handle the packet using ultra reliability and low latency (URLLC) handling. Based on the indication, the SMF 324 may configure the UPF 302 to handle the packet with URLLC handling, such that when the UPF 302 detects the packet with URLLC marking, it delivers the packet with high priority, and may duplicate the packets to enhance the reliability and low latency.

Figure 11:
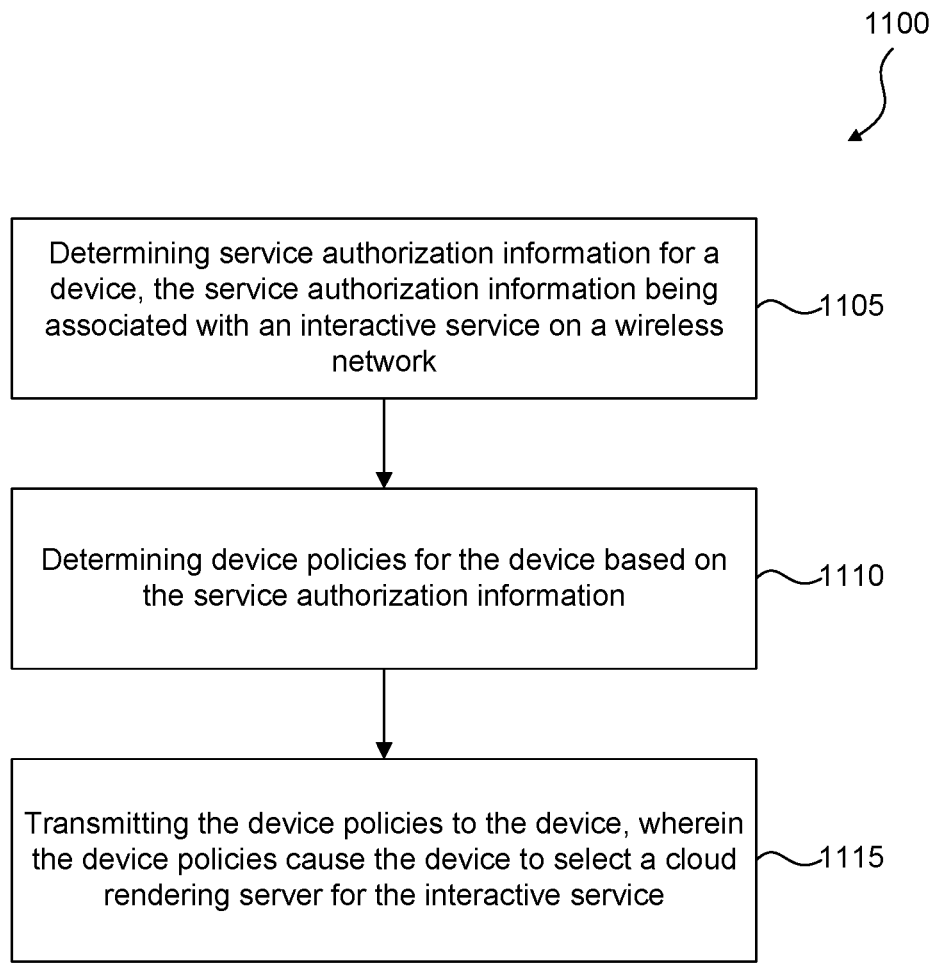
FIG. 11 illustrates a method for providing interactive services to a device, according to some embodiments of the disclosure.

FIG. 11 illustrates a method for providing interactive services to a device, according to some embodiments of the disclosure. For example, at 1105, a method 1100 includes determining service authorization information for a device, the service authorization information being associated with an interactive service on a wireless network. At 1110, the method 1100 determining device policies for the device based on the service authorization information. At 1115, the method 1100 includes transmitting the device policies to the device, wherein the device policies cause the device to select a cloud rendering server for the interactive service. The steps in method 1100 may be at least partially performed by one or more of application circuitry 405 or 505, baseband circuitry 410 or 510, and/or processors 1010.

Figure 12:
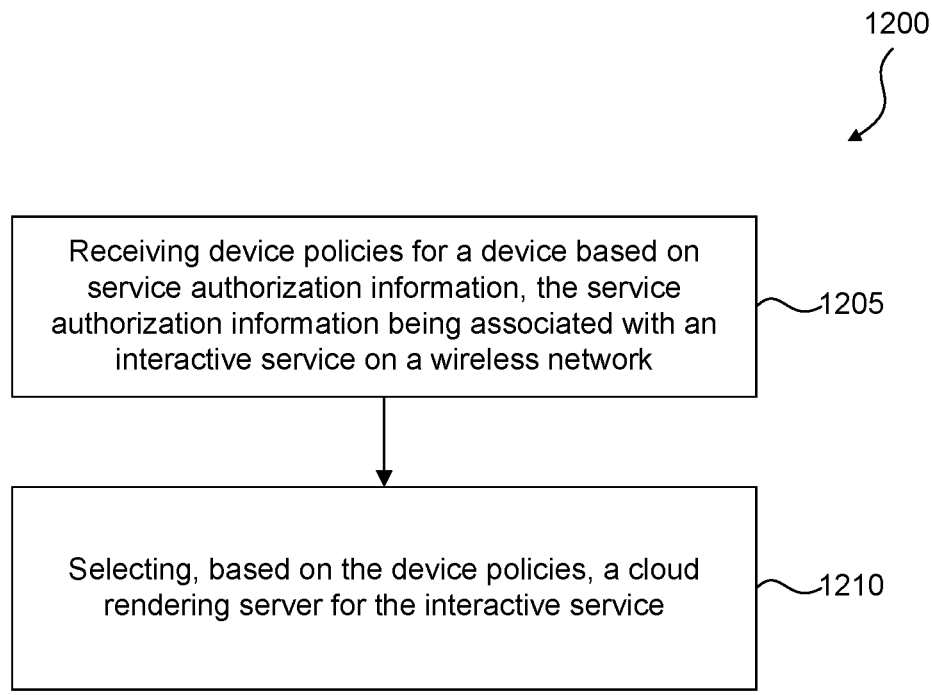
FIG. 12 illustrates a method for selecting a cloud rendering server, according to some embodiments of the disclosure.

FIG. 12 illustrates a method for selecting a cloud rendering server, according to some embodiments of the disclosure. For example, at 1205, the method may include receiving device policies for a device based on service authorization information, the service authorization information being associated with an interactive service on a wireless network. At 1210, the method may also include selecting, based on the device policies, a cloud rendering server for the interactive service. The steps in method 1200 may be at least partially performed by one or more of application circuitry 405 or 505, baseband circuitry 410 or 510, and/or processors 1010.

Systems and Implementations

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101*a* and UE 101*b* (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with an or RAN 110. In embodiments, the RAN 110 may be an NG RAN or a 5G RAN, an E-UTRAN, or a legacy RAN, such as a UTRAN or GERAN. As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs (see, e.g., FIG. 4), and the gNB-CU may be operated by a server that is located in the RAN 110 (not shown) or by a server pool in a similar manner as the CRAN/vBBUP. Additionally or alternatively, one or more of the RAN nodes 111 may be ne6 generation eNBs (ng-eNBs), which are RAN nodes that provide E-UTRA user plane and control plane protocol terminations toward the UEs 101, and are connected to a 5GC (e.g., CN 320 of FIG. 3) via an NG interface (discussed infra).

In V2X scenarios one or more of the RAN nodes 111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 101, 102 and the RAN nodes 111, 112 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101, 102 and the RAN nodes 111, 112 may operate using LAA, eLAA, and/or feLAA mechanisms. In these implementations, the UEs 101, 102 and the RAN nodes 111, 112 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101, 102, RAN nodes 111, 112, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101 or 102, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101, 102 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an e6ension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 111 may be configured to communicate with one another via interface 112. In embodiments where the system 100 is an LTE system (e.g., when CN 120 is an EPC 220 as in FIG. 2), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including conte6 transfers from source to target eNBs, user plane transport control, etc.; load management functionality; as well as inter-cell interference coordination functionality.

In embodiments where the system 100 is a 5G or NR system (e.g., when CN 120 is an 5GC 320 as in FIG. 3), the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include conte6 transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs. Embodiments where the CN 120 is a 5GC 120 are discussed in more detail with regard to FIG. 3.

In embodiments, the CN 120 may be a 5G CN (referred to as "5GC 120" or the like), while in other embodiments, the CN 120 may be an EPC). Where CN 120 is an EPC (referred to as "EPC 120" or the like), the RAN 110 may be connected with the CN 120 via an S1 interface 113. In embodiments, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMEs. An example architecture wherein the CN 120 is an EPC 120 is shown by FIG. 2.

Figure 2:
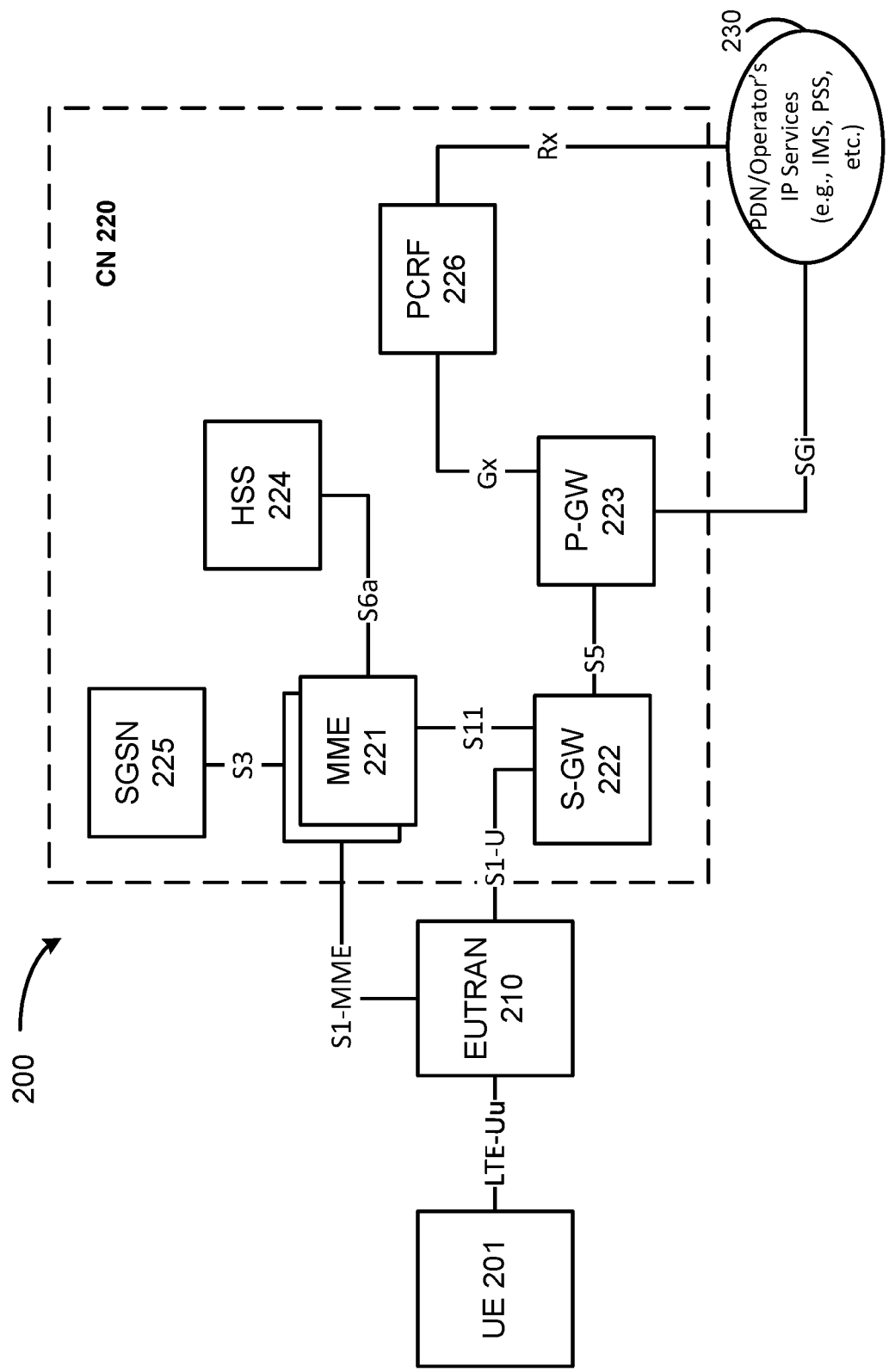
FIG. 2 illustrates an example architecture of a system including a first core network (CN), according to some embodiments of the disclosure.

FIG. 2 illustrates an example architecture of a system 200 including a first CN 220, in accordance with various embodiments. In this example, system 200 may implement the LTE standard wherein the CN 220 is an EPC 220 that corresponds with CN 120 of FIG. 1. Additionally, the UE 201 may be the same or similar as the UEs 101 of FIG. 1, and the E-UTRAN 210 may be a RAN that is the same or similar to the RAN 110 of FIG. 1, and which may include RAN nodes 111 discussed previously. The CN 220 may comprise MMEs 221, an S-GW 222, a P-GW 223, a HSS 224, and a SGSN 225.

The MMEs 221 may be similar in function to the control plane of legacy SGSN, and may implement MM functions to keep track of the current location of a UE 201. The MMEs 221 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 201, provide user identity confidentiality, and/or perform other like services to users/subscribers. Each UE 201 and the MME 221 may include an MM or EMM sublayer, and an MM conte6 may be established in the UE 201 and the MME 221 when an attach procedure is successfully completed. The MM conte6 may be a data structure or database object that stores MM-related information of the UE 201. The MMEs 221 may be coupled with the HSS 224 via an S6a reference point, coupled with the SGSN 225 via an S3 reference point, and coupled with the S-GW 222 via an S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMEs 221; handling of UE 201 time zone functions as specified by the MMEs 221; and MME selection for handovers to E-UTRAN 3GPP access network. The S3 reference point between the MMEs 221 and the SGSN 225 may enable user and bearer information exchange for inter-3GPP access network mobility in idle and/or active states.

The HSS 224 may comprise a database for network users, including subscription-related information to support the network entities' handling of communication sessions. The EPC 220 may comprise one or several HSSs 224, depending on the number of mobile subscribers, on the capacity of the equipment, on the organization of the network, etc. For example, the HSS 224 can provide support for routing/ roaming, authentication, authorization, naming/addressing resolution, location dependencies, etc. An S6a reference point between the HSS 224 and the MMEs 221 may enable transfer of subscription and authentication data for authenticating/authorizing user access to the EPC 220 between HSS 224 and the MMEs 221.

The S-GW 222 may terminate the S1 interface 113 ("S1-U" in FIG. 2) toward the RAN 210, and routes data packets between the RAN 210 and the EPC 220. In addition, the S-GW 222 may be a local mobility anchor point for inter-RAN node handovers and also may provide an anchor for inter-3GPP mobility. Other responsibilities may include lawful intercept, charging, and some policy enforcement. The S11 reference point between the S-GW 222 and the MMEs 221 may provide a control plane between the MMES 221 and the S-GW 222. The S-GW 222 may be coupled with the P-GW 223 via an S5 reference point.

The P-GW 223 may terminate an SGi interface toward a PDN 230. The P-GW 223 may route data packets between the EPC 220 and external networks such as a network including the application server 130 (alternatively referred to as an "AF") via an IP interface 125 (see e.g., FIG. 1). In embodiments, the P-GW 223 may be communicatively coupled to an application server (application server 130 of FIG. 1 or PDN 230 in FIG. 2) via an IP communications interface 125 (see, e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., PCEF (not shown)). Additionally, the SGi reference point between the P-GW 223 and the packet data network (PDN) 230 may be an operator external public, a private PDN, or an intra operator packet data network, for example, for provision of IMS services. The P-GW 223 may be coupled with a PCRF 226 via a Gx reference point.

PCRF 226 is the policy and charging control element of the EPC 220. In a non-roaming scenario, there may be a single PCRF 226 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate QoS and charging parameters. The PCRF 226 may provision this rule into a PCEF (not shown) with the appropriate TFT and QCI, which commences the QoS and charging as specified by the application server 230. The Gx reference point between the PCRF 226 and the P-GW 223 may allow for the transfer of QoS policy and charging rules from the PCRF 226 to PCEF in the P-GW 223. An Rx reference point may reside between the PDN 230 (or "AF 230") and the PCRF 226.

Figure 3:
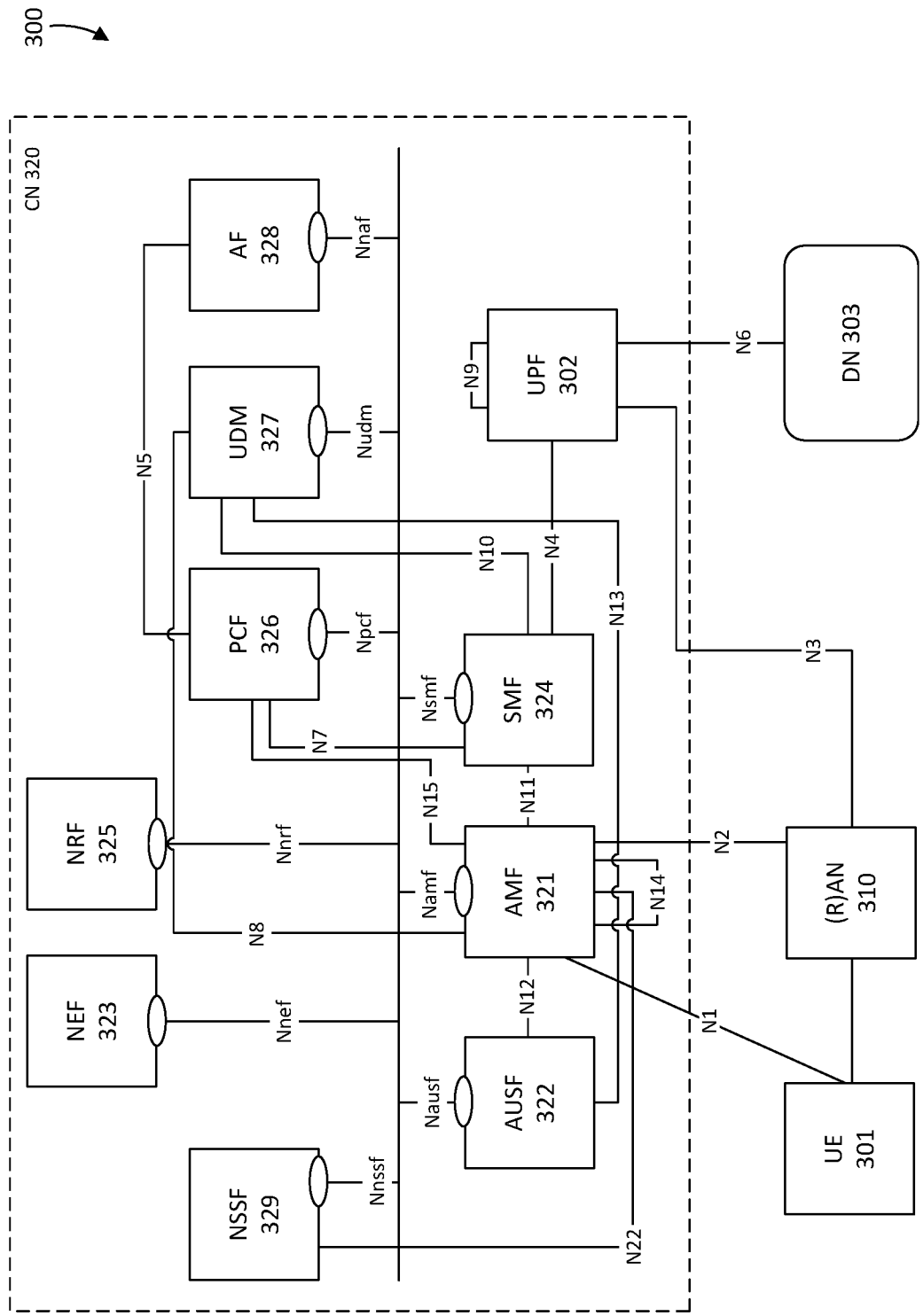
FIG. 3 illustrates an architecture of a system including a second CN, according to some embodiments of the disclosure.

FIG. 3 illustrates an architecture of a system 300 including a second CN 320 in accordance with various embodiments. The system 300 is shown to include a UE 301, which may be the same or similar to the UEs 101 and UE 201 discussed previously; a (R)AN 310, which may be the same or similar to the RAN 110 and RAN 210 discussed previously, and which may include RAN nodes 111 discussed previously; and a DN 303, which may be, for example, operator services, Internet access or 3rd party services; and a 5GC 320. The 5GC 320 may include an AUSF 322; an AMF 321; a SMF 324; a NEF 323; a PCF 326; a NRF 325; a UDM 327; an AF 328; a UPF 302; and a NSSF 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 302 may include an uplink classifier to support routing traffic flows to a data network. The DN 303 may represent various network operator services, Internet access, or third party services. DN 303 may include, or be similar to, application server 130 discussed previously. The UPF 302 may interact with the SMF 324 via an N4 reference point between the SMF 324 and the UPF 302.

The AUSF 322 may store data for authentication of UE 301 and handle authentication-related functionality. The AUSF 322 may facilitate a common authentication framework for various access types. The AUSF 322 may communicate with the AMF 321 via an N12 reference point between the AMF 321 and the AUSF 322; and may communicate with the UDM 327 via an N13 reference point between the UDM 327 and the AUSF 322. Additionally, the AUSF 322 may exhibit an Nausf service-based interface.

The AMF 321 may be responsible for registration management (e.g., for registering UE 301, etc.), connection management, reachability management, mobility management, and lawful interception of AMF-related events, and access authentication and authorization. The AMF 321 may be a termination point for the an N11 reference point between the AMF 321 and the SMF 324. The AMF 321 may provide transport for SM messages between the UE 301 and the SMF 324, and act as a transparent proxy for routing SM messages. AMF 321 may also provide transport for SMS messages between UE 301 and an SMSF (not shown by FIG. 3). AMF 321 may act as SEAF, which may include interaction with the AUSF 322 and the UE 301, receipt of an intermediate key that was established as a result of the UE 301 authentication process. Where USIM based authentication is used, the AMF 321 may retrieve the security material from the AUSF 322. AMF 321 may also include a SCM function, which receives a key from the SEA that it uses to derive access-network specific keys. Furthermore, AMF 321 may be a termination point of a RAN CP interface, which may include or be an N2 reference point between the (R)AN 310 and the AMF 321; and the AMF 321 may be a termination point of NAS (N1) signalling, and perform NAS ciphering and integrity protection.

AMF 321 may also support NAS signalling with a UE 301 over an N3 IWF interface. The N3IWF may be used to provide access to untrusted entities. N3IWF may be a termination point for the N2 interface between the (R)AN 310 and the AMF 321 for the control plane, and may be a termination point for the N3 reference point between the (R)AN 310 and the UPF 302 for the user plane. As such, the AMF 321 may handle N2 signalling from the SMF 324 and the AMF 321 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 301 and AMF 321 via an N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 may exhibit an Namf service-based interface, and may be a termination point for an N14 reference point between two AMFs 321 and an N17 reference point between the AMF 321 and a 5G-EIR (not shown by FIG. 3).

The UE 301 may need to register with the AMF 321 in order to receive network services. RM is used to register or deregister the UE 301 with the network (e.g., AMF 321), and establish a UE conte6 in the network (e.g., AMF 321). The UE 301 may operate in an RM-REGISTERED state or an RM-DEREGISTERED state. In the RM-DEREGISTERED state, the UE 301 is not registered with the network, and the UE conte6 in AMF 321 holds no valid location or routing information for the UE 301 so the UE 301 is not reachable by the AMF 321. In the RM-REGISTERED state, the UE 301 is registered with the network, and the UE conte6 in AMF 321 may hold a valid location or routing information for the UE 301 so the UE 301 is reachable by the AMF 321. In the RM-REGISTERED state, the UE 301 may perform mobility Registration Update procedures, perform periodic Registration Update procedures triggered by expiration of the periodic update timer (e.g., to notify the network that the UE 301 is still active), and perform a Registration Update procedure to update UE capability information or to re-negotiate protocol parameters with the network, among others.

The AMF 321 may store one or more RM conte6s for the UE 301, where each RM conte6 is associated with a specific access to the network. The RM conte6 may be a data structure, database object, etc. that indicates or stores, inter alia, a registration state per access type and the periodic update timer. The AMF 321 may also store a 5GC MM conte6 that may be the same or similar to the (E)MM conte6 discussed previously. In various embodiments, the AMF 321 may store a CE mode B Restriction parameter of the UE 301 in an associated MM conte6 or RM conte6. The AMF 321 may also derive the value, when needed, from the UE's usage setting parameter already stored in the UE conte6 (and/or MM/RM conte6).

CM may be used to establish and release a signaling connection between the UE 301 and the AMF 321 over the N1 interface. The signaling connection is used to enable NAS signaling exchange between the UE 301 and the CN 320, and comprises both the signaling connection between the UE and the AN (e.g., RRC connection or UE-N3IWF connection for non-3GPP access) and the N2 connection for the UE 301 between the AN (e.g., RAN 310) and the AMF 321. The UE 301 may operate in one of two CM states, CM-IDLE mode or CM-CONNECTED mode. When the UE 301 is operating in the CM-IDLE state/mode, the UE 301 may have no NAS signaling connection established with the AMF 321 over the N1 interface, and there may be (R)AN 310 signaling connection (e.g., N2 and/or N3 connections) for the UE 301. When the UE 301 is operating in the CM-CONNECTED state/mode, the UE 301 may have an established NAS signaling connection with the AMF 321 over the N1 interface, and there may be a (R)AN 310 signaling connection (e.g., N2 and/or N3 connections) for the UE 301. Establishment of an N2 connection between the (R)AN 310 and the AMF 321 may cause the UE 301 to transition from CM-IDLE mode to CM-CONNECTED mode, and the UE 301 may transition from the CM-CONNECTED mode to the CM-IDLE mode when N2 signaling between the (R)AN 310 and the AMF 321 is released.

The SMF 324 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 301 and a data network (DN) 303 identified by a Data Network Name (DNN). PDU sessions may be established upon UE 301 request, modified upon UE 301 and 5GC 320 request, and released upon UE 301 and 5GC 320 request using NAS SM signaling exchanged over the N1 reference point between the UE 301 and the SMF 324. Upon request from an application server, the 5GC 320 may trigger a specific application in the UE 301. In response to receipt of the trigger message, the UE 301 may pass the trigger message (or relevant parts/information of the trigger message) to one or more identified applications in the UE 301. The identified application(s) in the UE 301 may establish a PDU session to a specific DNN. The SMF 324 may check whether the UE 301 requests are compliant with user subscription information associated with the UE 301. In this regard, the SMF 324 may retrieve and/or request to receive update notifications on SMF 324 level subscription data from the UDM 327.

The SMF 324 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

The NEF 323 may provide means for securely exposing the services and capabilities provided by 3GPP network functions for third party, internal exposure/re-exposure, Application Functions (e.g., AF 328), edge computing or fog computing systems, etc. In such embodiments, the NEF 323 may authenticate, authorize, and/or throttle the AFs. NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using standardized interfaces. The stored information can then be re-exposed by the NEF 323 to other NFs and AFs, and/or used for other purposes such as analytics. Additionally, the NEF 323 may exhibit an Nnef service-based interface.

The NRF 325 may support service discovery functions, receive NF discovery requests from NF instances, and provide the information of the discovered NF instances to the NF instances. NRF 325 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 325 may exhibit the Nnrf service-based interface.

The PCF 326 may provide policy rules to control plane function(s) to enforce them, and may also support unified policy framework to govern network behaviour. The PCF 326 may also implement an FE to access subscription information relevant for policy decisions in a UDR of the UDM 327. The PCF 326 may communicate with the AMF 321 via an N15 reference point between the PCF 326 and the AMF 321, which may include a PCF 326 in a visited network and the AMF 321 in case of roaming scenarios. The PCF 326 may communicate with the AF 328 via an N5 reference point between the PCF 326 and the AF 328; and with the SMF 324 via an N7 reference point between the PCF 326 and the SMF 324. The system 300 and/or CN 320 may also include an N24 reference point between the PCF 326 (in the home network) and a PCF 326 in a visited network. Additionally, the PCF 326 may exhibit an Npcf service-based interface.

The UDM 327 may handle subscription-related information to support the network entities' handling of communication sessions, and may store subscription data of UE 301. For example, subscription data may be communicated between the UDM 327 and the AMF 321 via an N8 reference point between the UDM 327 and the AMF. The UDM 327 may include two parts, an application FE and a UDR (the FE and UDR are not shown by FIG. 3). The UDR may store subscription data and policy data for the UDM 327 and the PCF 326, and/or structured data for exposure and application data (including PFDs for application detection, application request information for multiple UEs 301) for the NEF 323. The Nudr service-based interface may be exhibited by the UDR 221 to allow the UDM 327, PCF 326, and NEF 323 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 324 via an N10 reference point between the UDM 327 and the SMF 324. UDM 327 may also support SMS management, wherein an SMS-FE implements the similar application logic as discussed previously. Additionally, the UDM 327 may exhibit the Nudm service-based interface.

The AF 328 may provide application influence on traffic routing, provide access to the NCE, and interact with the policy framework for policy control. The NCE may be a mechanism that allows the 5GC 320 and AF 328 to provide information to each other via NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 via the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs. Additionally, the AF 328 may exhibit an Naf service-based interface.

The NSSF 329 may select a set of network slice instances serving the UE 301. The NSSF 329 may also determine allowed NSSAI and the mapping to the subscribed S-NSSAIs, if needed. The NSSF 329 may also determine the AMF set to be used to serve the UE 301, or a list of candidate AMF(s) 321 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 via an N22 reference point between AMF 321 and NSSF 329; and may communicate with another NSSF 329 in a visited network via an N31 reference point (not shown by FIG. 3). Additionally, the NSSF 329 may exhibit an Nnssf service-based interface.

As discussed previously, the CN 320 may include an SMSF, which may be responsible for SMS subscription checking and verification, and relaying SM messages to/from the UE 301 to/from other entities, such as an SMS-GMSC/IWMSC/SMS-router. The SMS may also interact with AMF 321 and UDM 327 for a notification procedure that the UE 301 is available for SMS transfer (e.g., set a UE not reachable flag, and notifying UDM 327 when UE 301 is available for SMS).

The CN 120 may also include other elements that are not shown by FIG. 3, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE conte6s), via N18 reference point between any NF and the UDSF (not shown by FIG. 3). Individual NFs may share a UDSF for storing their respective unstructured data or individual NFs may each have their own UDSF located at or near the individual NFs. Additionally, the UDSF may exhibit an Nudsf service-based interface (not shown by FIG. 3). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 3 for clarity. In one example, the CN 320 may include an Nx interface, which is an inter-CN interface between the MME (e.g., MME 221) and the AMF 321 in order to enable interworking between CN 320 and CN 220. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 4:
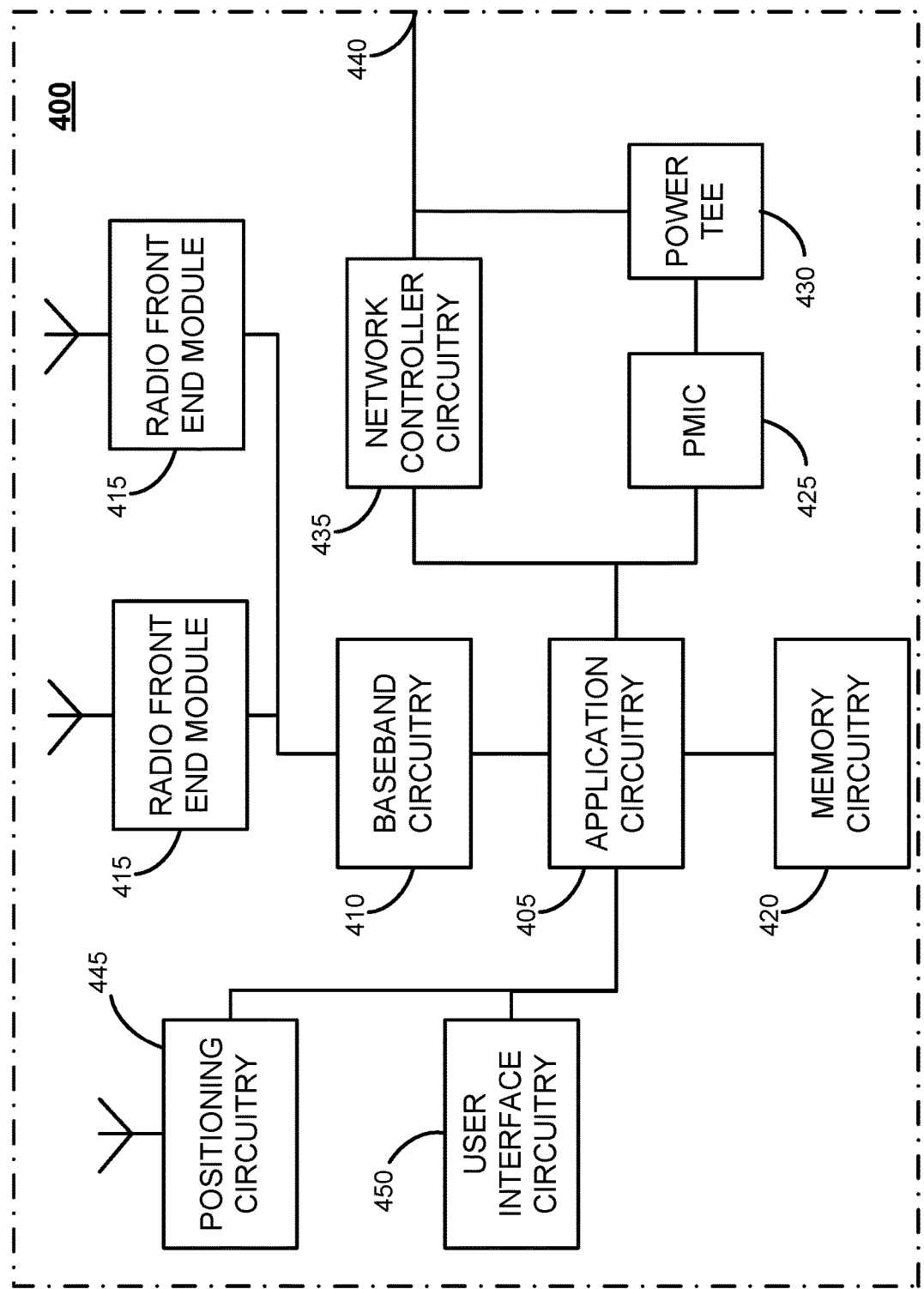
FIG. 4 illustrates an example of infrastructure equipment, according to some embodiments of the disclosure.

FIG. 4 illustrates an example of infrastructure equipment 400 in accordance with various embodiments. The infrastructure equipment 400 (or "system 400") may be implemented as a base station, radio head, RAN node such as the RAN nodes 111 and/or AP 106 shown and described previously, application server(s) 130, and/or any other element/device discussed herein. In other examples, the system 400 could be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface 450. In some embodiments, the device 400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 405 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 405 may be coupled with or may include memory/storage elements and may be configured to execute instructions stored in the memory/storage to enable various applications or operating systems to run on the system 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 405 may comprise, or may be, a special-purpose processor/controller to operate according to the various embodiments herein. As examples, the processor(s) of application circuitry 405 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 400 may not utilize application circuitry 405, and instead may include a special-purpose processor/controller to process IP data received from an EPC or 5GC, for example.

In some implementations, the application circuitry 405 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 405 may comprise logic blocks or logic fabric, and other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 410 are discussed infra with regard to FIG. 6.

User interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 6111 of FIG. 6 infra), and the RFEM may be connected to multiple antennas. In alternative implementations, both mmWave and sub-mmWave radio functions may be implemented in the same physical RFEM 415, which incorporates both mmWave antennas and sub-mmWave.

The memory circuitry 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 420 may be implemented as one or more of solder down packaged integrated circuits, socketed memory modules and plug-in memory cards.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 400 via network interface connector 440 using a physical connection, which may be electrical (commonly referred to as a "copper interconnect"), optical, or wireless. The network controller circuitry 435 may include one or more dedicated processors and/or FPGAs to communicate using one or more of the aforementioned protocols. In some implementations, the network controller circuitry 435 may include multiple controllers to provide connectivity to other networks using the same or different protocols.

The positioning circuitry 445 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 445 may include a Micro-Technology for Positioning, Navigation, and Timing (Micro-PNT) IC that uses a master timing clock to perform position tracking/estimation without GNSS assistance. The positioning circuitry 445 may also be part of, or interact with, the baseband circuitry 410 and/or RFEMs 415 to communicate with the nodes and components of the positioning network. The positioning circuitry 445 may also provide position data and/or time data to the application circuitry 405, which may use the data to synchronize operations with various infrastructure (e.g., RAN nodes 111, etc.), or the like.

The components shown by FIG. 4 may communicate with one another using interface circuitry, which may include any number of bus and/or interconnect (IX) technologies such as industry standard architecture (ISA), e6ended ISA (EISA), peripheral component interconnect (PCI), peripheral component interconnect e6ended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 5:
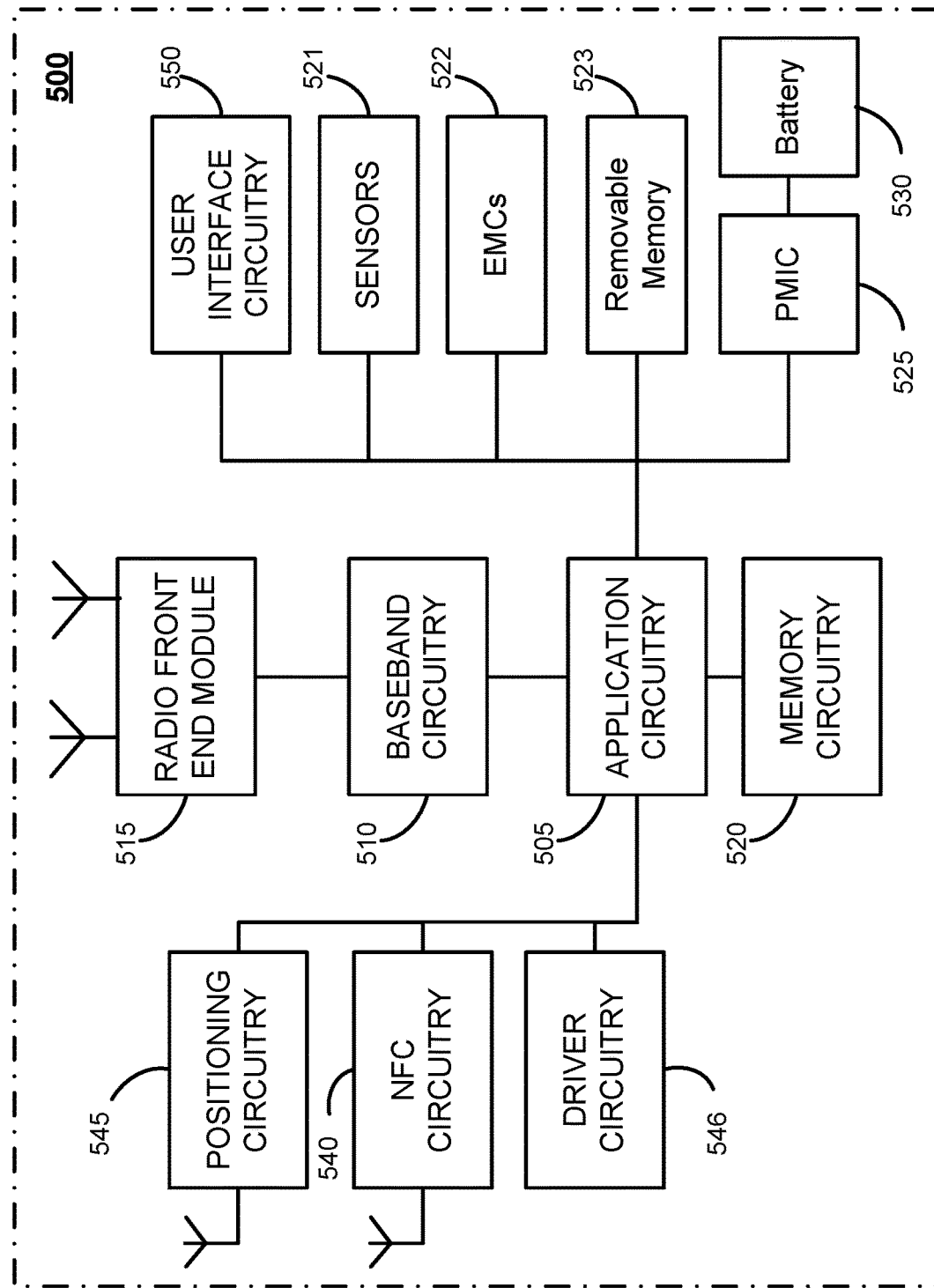
FIG. 5 illustrates an example of a device, according to some embodiments of the disclosure.

FIG. 5 illustrates an example of a platform 500 (or "device 500") in accordance with various embodiments. In embodiments, the computer platform 500 may be suitable for use as UEs 101, 102, 201, application servers 130, and/or any other element/device discussed herein. The platform 500 may include any combinations of the components shown in the example. The components of platform 500 may be implemented as integrated circuits (ICs), portions thereof, discrete electronic devices, or other modules, logic, hardware, software, firmware, or a combination thereof adapted in the computer platform 500, or as components otherwise incorporated within a chassis of a larger system. The block diagram of FIG. 5 is intended to show a high level view of components of the computer platform 500. However, some of the components shown may be omitted, additional components may be present, and different arrangement of the components shown may occur in other implementations.

Application circuitry 505 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or may include memory/storage elements and may be configured to execute instructions stored in the memory/storage to enable various applications or operating systems to run on the system 500. In some implementations, the memory/storage elements may be on-chip memory circuitry, which may include any suitable volatile and/or nonvolatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultralow voltage processor, an embedded processor, some other known processing element, or any suitable combination thereof. In some embodiments, the application circuitry 405 may comprise, or may be, a special-purpose processor/controller to operate according to the various embodiments herein.

As examples, the processor(s) of application circuitry 505 may include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 505 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 505 may be a part of a system on a chip (SoC) in which the application circuitry 505 and other components are formed into a single integrated circuit, or a single package, such as the Edison™ or Galileo™ SoC boards from Intel® Corporation.

Additionally or alternatively, application circuitry 505 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 505 may comprise logic blocks or logic fabric, and other interconnected resources that may be programmed to perform various functions, such as the procedures, methods, functions, etc. of the various embodiments discussed herein. In such embodiments, the circuitry of application circuitry 505 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed infra with regard to FIG. 6.

The RFEMs 515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 6111 of FIG. 6 infra), and the RFEM may be connected to multiple antennas. In alternative implementations, both mmWave and sub-mmWave radio functions may be implemented in the same physical RFEM 515, which incorporates both mmWave antennas and sub-mmWave.

The memory circuitry 520 may include any number and type of memory devices used to provide for a given amount of system memory. As examples, the memory circuitry 520 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 520 may be developed in accordance with a Joint Electron Devices Engineering Council (JEDEC) low power double data rate (LPDDR)-based design, such as LPDDR2, LPDDR3, LPDDR4, or the like. Memory circuitry 520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 520 may be on-die memory or registers associated with the application circuitry 505. To provide for persistent storage of information such as data, applications, operating systems and so forth, memory circuitry 520 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 500 may incorporate the three-dimensional (3D) cross-point (XPOINT) memories from Intel® and Micron®.

Removable memory circuitry 523 may include devices, circuitry, enclosures/housings, ports or receptacles, etc. used to couple portable data storage devices with the platform 500. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 500 may also include interface circuitry (not shown) that is used to connect external devices with the platform 500. The external devices connected to the platform 500 via the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 522 include devices, modules, or subsystems whose purpose is to enable platform 500 to change its state, position, and/or orientation, or move or control a mechanism or (sub)system. Additionally, EMCs 522 may be configured to generate and send messages/signalling to other components of the platform 500 to indicate a current state of the EMCs 522. Examples of the EMCs 522 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 500 is configured to operate one or more EMCs 522 based on one or more captured events and/or instructions or control signals received from a service provider and/or various clients.

In some implementations, the interface circuitry may connect the platform 500 with positioning circuitry 545. The positioning circuitry 545 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 545 may include a Micro-PNT IC that uses a master timing clock to perform position tracking/estimation without GNSS assistance. The positioning circuitry 545 may also be part of, or interact with, the baseband circuitry 410 and/or RFEMs 515 to communicate with the nodes and components of the positioning network. The positioning circuitry 545 may also provide position data and/or time data to the application circuitry 505, which may use the data to synchronize operations with various infrastructure (e.g., radio base stations), for turn-by-turn navigation applications, or the like In some implementations, the interface circuitry may connect the platform 500 with Near-Field Communication (NFC) circuitry 540. NFC circuitry 540 is configured to provide contactless, short-range communications based on radio frequency identification (RFID) standards, wherein magnetic field induction is used to enable communication between NFC circuitry 540 and NFC-enabled devices external to the platform 500 (e.g., an "NFC touchpoint"). NFC circuitry 540 comprises an NFC controller coupled with an antenna element and a processor coupled with the NFC controller. The NFC controller may be a chip/IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact with or control various input/output (I/O) devices that may be present within, or connected to, the platform 500. For example, driver circuitry 546 may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 and/or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may often be included when the platform 500 is capable of being powered by a battery 530, for example, when the device is included in a UE 101, 102, 201.

In some embodiments, the PMIC 525 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an e6ended period of time, then the platform 500 may transition off to an RRC_Idle state, where it disconnects from the network and does not perform operations such as channel quality feedback, handover, etc. The platform 500 goes into a very low power state and it performs paging where again it periodically wakes up to listen to the network and then powers down again. The platform 500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 530 may power the platform 500, although in some examples the platform 500 may be mounted deployed in a fixed location, and may have a power supply coupled to an electrical grid. The battery 530 may be a lithium ion battery, a metal-air battery, such as a zinc-air battery, an aluminum-air battery, a lithium-air battery, and the like. In some implementations, such as in V2X applications, the battery 530 may be a typical lead-acid automotive battery.

In some implementations, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, sensing frequency, and the like.

A power block, or other power supply coupled to an electrical grid may be coupled with the BMS to charge the battery 530. In some examples, the power block XS30 may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 550 includes various input/output (I/O) devices present within, or connected to, the platform 500, and includes one or more user interfaces designed to enable user interaction with the platform 500 and/or peripheral component interfaces designed to enable peripheral component interaction with the platform 500. The user interface circuitry 550 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 500. The output device circuitry may also include speakers or other audio emitting devices, printer(s), and/or the like. In some embodiments, the sensor circuitry 521 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 500 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 6:
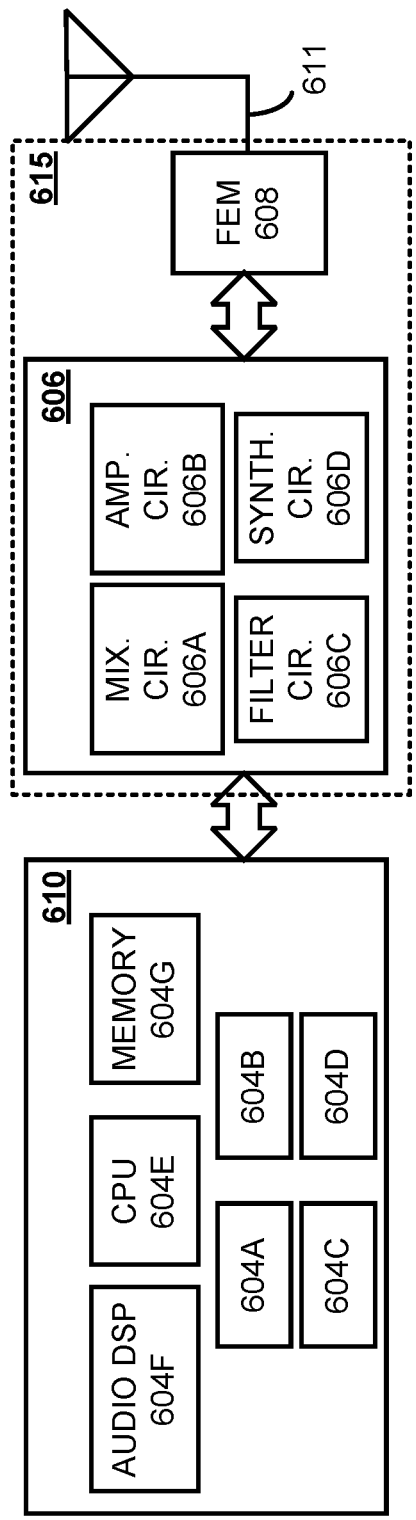
FIG. 6 illustrates example components of baseband circuitry and radio front end modules (RFEM), according to some embodiments of the disclosure.

FIG. 6 illustrates example components of baseband circuitry 6110 and radio front end modules (RFEM) 6115 in accordance with various embodiments. The baseband circuitry 6110 corresponds to the baseband circuitry 410 and 510 of FIGS. 4 and 5, respectively. The RFEM 6115 corresponds to the RFEM 415 and 515 of FIGS. 4 and 5, respectively. As shown, the RFEMs 6115 may include Radio Frequency (RF) circuitry 6106, front-end module (FEM) circuitry 6108, antenna array 6111 coupled together at least as shown.

The baseband circuitry 6110 includes circuitry and/or control logic configured to carry out various radio/network protocol and radio control functions that enable communication with one or more radio networks via the RF circuitry 6106. The radio control functions may include, but are not limited to, signal modulation/demodulation, encoding/decoding, radio frequency shifting, etc. In some embodiments, modulation/demodulation circuitry of the baseband circuitry 6110 may include Fast-Fourier Transform (FFT), precoding, or constellation mapping/demapping functionality. In some embodiments, encoding/decoding circuitry of the baseband circuitry 6110 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 6110 is configured to process baseband signals received from a receive signal path of the RF circuitry 6106 and to generate baseband signals for a transmit signal path of the RF circuitry 6106. The baseband circuitry 6110 is configured to interface with application circuitry 405/505 (see FIGS. 4 and 5) for generation and processing of the baseband signals and for controlling operations of the RF circuitry 6106. The baseband circuitry 6110 may handle various radio control functions.

The aforementioned circuitry and/or control logic of the baseband circuitry 6110 may include one or more single or multi-core processors. For example, the one or more processors may include a 3G baseband processor 6104A, a 4G/LTE baseband processor 6104B, a 5G/NR baseband processor 6104C, or some other baseband processor(s) 6104D for other existing generations, generations in development or to be developed in the future (e.g., si6h generation (6G), etc.). In other embodiments, some or all of the functionality of baseband processors 6104A-D may be included in modules stored in the memory 6104G and executed via a Central Processing Unit (CPU) 6104E. In other embodiments, some or all of the functionality of baseband processors 6104A-D may be provided as hardware accelerators (e.g., FPGAs, ASICs, etc.) loaded with the appropriate bit streams or logic blocks stored in respective memory cells. In various embodiments, the memory 6104G may store program code of a real-time OS (RTOS), which when executed by the CPU 6104E (or other baseband processor), is to cause the CPU 6104E (or other baseband processor) to manage resources of the baseband circuitry 6110, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 6110 includes one or more audio digital signal processor(s) (DSP) 6104F. The audio DSP(s) 6104F include elements for compression/decompression and echo cancellation and may include other suitable processing elements in other embodiments.

In some embodiments, each of the processors 6104A-6104E include respective memory interfaces to send/receive data to/from the memory 6104G. The baseband circuitry 6110 may further include one or more interfaces to communicatively couple to other circuitries/devices, such as an interface to send/receive data to/from memory external to the baseband circuitry 6110; an application circuitry interface to send/receive data to/from the application circuitry 405/505 of FIGS. 4-6); an RF circuitry interface to send/receive data to/from RF circuitry 6106 of FIG. 6; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 525.

In alternate embodiments (which may be combined with the above described embodiments), baseband circuitry 6110 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 6110 may include protocol processing circuitry with one or more instances of control circuitry (not shown) to provide control functions for the digital baseband circuitry and/or radio frequency circuitry (e.g., the radio front end modules 6115).

Although not shown by FIG. 6, in some embodiments, the baseband circuitry 6110 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 6110 and/or RF circuitry 6106 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 6110 and/or RF circuitry 6106 are part of a Wi-Fi communication system. In the second example, the protocol processing circuitry would operate Wi-Fi MAC and logical link control (LLC) functions. The protocol processing circuitry may include one or more memory structures (e.g., 6104G) to store program code and data for operating the protocol functions, as well as one or more processing cores to execute the program code and perform various operations using the data. The baseband circuitry 6110 may also support radio communications for more than one wireless protocol.

The various hardware elements of the baseband circuitry 6110 discussed herein may be implemented, for example, as a solder-down substrate including one or more integrated circuits (ICs), a single packaged IC soldered to a main circuit board or a multi-chip module containing two or more ICs. In one example, the components of the baseband circuitry 6110 may be suitably combined in a single chip or chipset, or disposed on a same circuit board. In another example, some or all of the constituent components of the baseband circuitry 6110 and RF circuitry 6106 may be implemented together such as, for example, a system on a chip (SoC) or System-in-Package (SiP). In another example, some or all of the constituent components of the baseband circuitry 6110 may be implemented as a separate SoC that is communicatively coupled with and RF circuitry 6106 (or multiple instances of RF circuitry 6106). In yet another example, some or all of the constituent components of the baseband circuitry 6110 and the application circuitry 405/505 may be implemented together as individual SoCs mounted to a same circuit board (e.g., a "multi-chip package").

In some embodiments, the baseband circuitry 6110 may provide for communication compatible with one or more radio technologies. For example, in some embodiments, the baseband circuitry 6110 may support communication with an E-UTRAN or other WMAN, a WLAN, a WPAN. Embodiments in which the baseband circuitry 6110 is configured to support radio communications of more than one wireless protocol may be referred to as multi-mode baseband circuitry.

RF circuitry 6106 may enable communication with wireless networks using modulated electromagnetic radiation through a non-solid medium. In various embodiments, the RF circuitry 6106 may include switches, filters, amplifiers, etc. to facilitate the communication with the wireless network. RF circuitry 6106 may include a receive signal path, which may include circuitry to down-convert RF signals received from the FEM circuitry 6108 and provide baseband signals to the baseband circuitry 6110. RF circuitry 6106 may also include a transmit signal path, which may include circuitry to up-convert baseband signals provided by the baseband circuitry 6110 and provide RF output signals to the FEM circuitry 6108 for transmission.

In some embodiments, the receive signal path of the RF circuitry 6106 may include mixer circuitry 6106a, amplifier circuitry 6106b and filter circuitry 6106c. In some embodiments, the transmit signal path of the RF circuitry 6106 may include filter circuitry 6106c and mixer circuitry 6106a. RF circuitry 6106 may also include synthesizer circuitry 6106d for synthesizing a frequency for use by the mixer circuitry 6106a of the receive signal path and the transmit signal path. In some embodiments, the mixer circuitry 6106a of the receive signal path may be configured to down-convert RF signals received from the FEM circuitry 6108 based on the synthesized frequency provided by synthesizer circuitry 6106d. The amplifier circuitry 6106b may be configured to amplify the down-converted signals and the filter circuitry 6106c may be a low-pass filter (LPF) or band-pass filter (BPF) configured to remove unwanted signals from the down-converted signals to generate output baseband signals. Output baseband signals may be provided to the baseband circuitry 6110 for further processing. In some embodiments, the output baseband signals may be zero-frequency baseband signals, although this is not a requirement. In some embodiments, mixer circuitry 6106a of the receive signal path may comprise passive mixers, although the scope of the embodiments is not limited in this respect.

In some embodiments, the mixer circuitry 6106a of the transmit signal path may be configured to up-convert input baseband signals based on the synthesized frequency provided by the synthesizer circuitry 6106d to generate RF output signals for the FEM circuitry 6108. The baseband signals may be provided by the baseband circuitry 6110 and may be filtered by filter circuitry 6106c.

In some embodiments, the mixer circuitry 6106a of the receive signal path and the mixer circuitry 6106a of the transmit signal path may include two or more mixers and may be arranged for quadrature downconversion and upconversion, respectively. In some embodiments, the mixer circuitry 6106a of the receive signal path and the mixer circuitry 6106a of the transmit signal path may include two or more mixers and may be arranged for image rejection (e.g., Hartley image rejection). In some embodiments, the mixer circuitry 6106a of the receive signal path and the mixer circuitry 6106a of the transmit signal path may be arranged for direct downconversion and direct upconversion, respectively. In some embodiments, the mixer circuitry 6106a of the receive signal path and the mixer circuitry 6106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 6106 may include analog-to-digital converter (ADC) and digital-to-analog converter (DAC) circuitry and the baseband circuitry 6110 may include a digital baseband interface to communicate with the RF circuitry 6106.

In some dual-mode embodiments, a separate radio IC circuitry may be provided for processing signals for each spectrum, although the scope of the embodiments is not limited in this respect.

In some embodiments, the synthesizer circuitry 6106d may be a fractional-N synthesizer or a fractional N/N+1 synthesizer, although the scope of the embodiments is not limited in this respect as other types of frequency synthesizers may be suitable. For example, synthesizer circuitry 6106d may be a delta-sigma synthesizer, a frequency multiplier, or a synthesizer comprising a phase-locked loop with a frequency divider.

The synthesizer circuitry 6106d may be configured to synthesize an output frequency for use by the mixer circuitry 6106a of the RF circuitry 6106 based on a frequency input and a divider control input. In some embodiments, the synthesizer circuitry 6106d may be a fractional N/N+1 synthesizer.

In some embodiments, frequency input may be provided by a voltage controlled oscillator (VCO), although that is not a requirement. Divider control input may be provided by either the baseband circuitry 6110 or the application circuitry 405/505 depending on the desired output frequency. In some embodiments, a divider control input (e.g., N) may be determined from a look-up table based on a channel indicated by the application circuitry 405/505.

Synthesizer circuitry 6106d of the RF circuitry 6106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 6106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 6106 may include an IQ/polar converter.

FEM circuitry 6108 may include a receive signal path, which may include circuitry configured to operate on RF signals received from antenna array 6111, amplify the received signals and provide the amplified versions of the received signals to the RF circuitry 6106 for further processing. FEM circuitry 6108 may also include a transmit signal path, which may include circuitry configured to amplify signals for transmission provided by the RF circuitry 6106 for transmission by one or more of antenna elements of antenna array 6111. In various embodiments, the amplification through the transmit or receive signal paths may be done solely in the RF circuitry 6106, solely in the FEM circuitry 6108, or in both the RF circuitry 6106 and the FEM circuitry 6108.

In some embodiments, the FEM circuitry 6108 may include a TX/RX switch to switch between transmit mode and receive mode operation. The FEM circuitry 6108 may include a receive signal path and a transmit signal path. The receive signal path of the FEM circuitry 6108 may include an LNA to amplify received RF signals and provide the amplified received RF signals as an output (e.g., to the RF circuitry 6106). The transmit signal path of the FEM circuitry 6108 may include a power amplifier (PA) to amplify input RF signals (e.g., provided by RF circuitry 6106), and one or more filters to generate RF signals for subsequent transmission by one or more antenna elements of the antenna array 6111.

The antenna array 6111 comprises one or more antenna elements, each of which is configured convert electrical signals into radio waves to travel through the air and to convert received radio waves into electrical signals. For example, digital baseband signals provided by the baseband circuitry 6110 is converted into analog RF signals (e.g., modulated waveform) that will be amplified and transmitted via the antenna elements of the antenna array 6111 including one or more antenna elements (not shown). The antenna elements may be omnidirectional, direction, or a combination thereof. The antenna elements may be formed in a multitude of arranges as are known and/or discussed herein. The antenna array 6111 may comprise microstrip antennas or printed antennas that are fabricated on the surface of one or more printed circuit boards. The antenna array 6111 may be formed in as a patch of metal foil (e.g., a patch antenna) in a variety of shapes, and may be coupled with the RF circuitry 6106 and/or FEM circuitry 6108 using metal transmission lines or the like.

Processors of the application circuitry 405/505 and processors of the baseband circuitry 6110 may be used to execute elements of one or more instances of a protocol stack. For example, processors of the baseband circuitry 6110, alone or in combination, may be used execute Layer 3, Layer 2, or Layer 1 functionality, while processors of the application circuitry 405/505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 7:
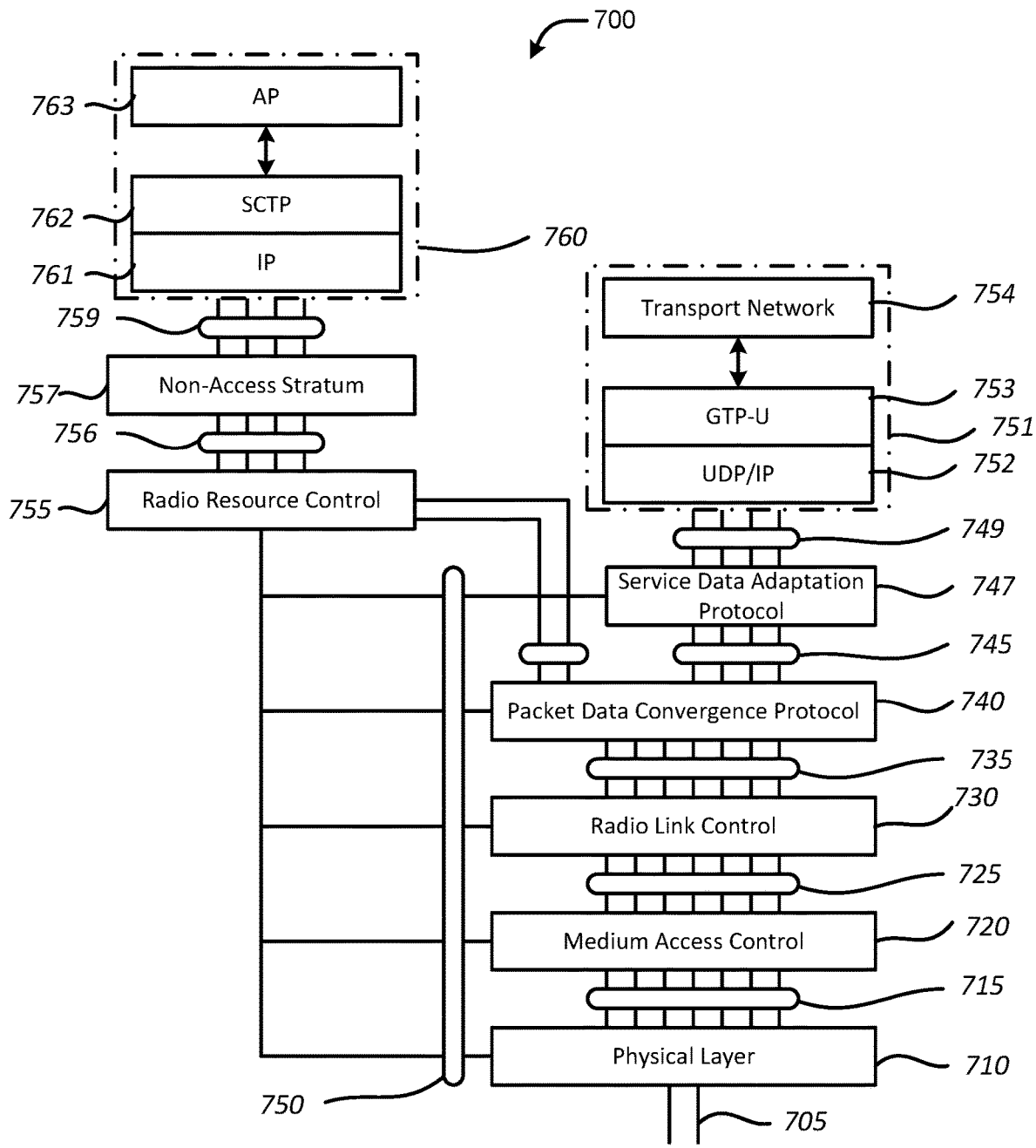
FIG. 7 illustrates various protocol functions that may be implemented in a wireless communication device, according to some embodiments of the disclosure.

FIG. 7 illustrates various protocol functions that may be implemented in a wireless communication device according to various embodiments. In particular, FIG. 7 includes an arrangement 700 showing interconnections between various protocol layers/entities. The following description of FIG. 7 is provided for various protocol layers/entities that operate in conjunction with the 5G/NR system standards and LTE system standards, but some or all of the aspects of FIG. 7 may be applicable to other wireless communication network systems as well.

The protocol layers of arrangement 700 may include one or more of PHY 710, MAC 720, RLC 730, PDCP 740, SDAP 747, RRC 755, and NAS layer 757, in addition to other higher layer functions not illustrated. The protocol layers may include one or more service access points (e.g., items 759, 756, 750, 749, 745, 735, 725, and 715 in FIG. 7) that may provide communication between two or more protocol layers.

The PHY 710 may transmit and receive physical layer signals 705 that may be received from or transmitted to one or more other communication devices. The physical layer signals 705 may comprise one or more physical channels, such as those discussed herein. The PHY 710 may further perform link adaptation or adaptive modulation and coding (AMC), power control, cell search (e.g., for initial synchronization and handover purposes), and other measurements used by higher layers, such as the RRC 755. The PHY 710 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 710 may process requests from and provide indications to an instance of MAC 720 via one or more PHY-SAP 715. According to some embodiments, requests and indications communicated via PHY-SAP 715 may comprise one or more transport channels.

Instance(s) of MAC 720 may process requests from, and provide indications to, an instance of RLC 730 via one or more MAC-SAPs 725. These requests and indications communicated via the MAC-SAP 725 may comprise one or more logical channels. The MAC 720 may perform mapping between the logical channels and transport channels, multiplexing of MAC SDUs from one or more logical channels onto TBs to be delivered to PHY 710 via the transport channels, de-multiplexing MAC SDUs to one or more logical channels from TBs delivered from the PHY 710 via transport channels, multiplexing MAC SDUs onto TBs, scheduling information reporting, error correction through HARQ, and logical channel prioritization.

Instance(s) of RLC 730 may process requests from and provide indications to an instance of PDCP 740 via one or more radio link control service access points (RLC-SAP) 735. These requests and indications communicated via RLC-SAP 735 may comprise one or more RLC channels. The RLC 730 may operate in a plurality of modes of operation, including: Transparent Mode™, Unacknowledged Mode (UM), and Acknowledged Mode (AM). The RLC 730 may execute transfer of upper layer protocol data units (PDUs), error correction through automatic repeat request (ARQ) for AM data transfers, and concatenation, segmentation and reassembly of RLC SDUs for UM and AM data transfers. The RLC 730 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 740 may process requests from and provide indications to instance(s) of RRC 755 and/or instance(s) of SDAP 747 via one or more packet data convergence protocol service access points (PDCP-SAP) 745. These requests and indications communicated via PDCP-SAP 745 may comprise one or more radio bearers. The PDCP 740 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 747 may process requests from and provide indications to one or more higher layer protocol entities via one or more SDAP-SAP 749. These requests and indications communicated via SDAP-SAP 749 may comprise one or more QoS flows. The SDAP 747 may map QoS flows to DRBs, and vice versa, and may also mark QFIs in DL and UL packets. A single SDAP entity 747 may be configured for an individual PDU session. In the UL direction, the NG-RAN 110 may control the mapping of QoS Flows to DRB(s) in two different ways, reflective mapping or explicit mapping. For reflective mapping, the SDAP 747 of a UE 101 may monitor the QFIs of the DL packets for each DRB, and may apply the same mapping for packets flowing in the UL direction. For a DRB, the SDAP 747 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 755 configuring the SDAP 747 with an explicit QoS flow to DRB mapping rule, which may be stored and followed by the SDAP 747. In embodiments, the SDAP 747 may only be used in NR implementations and may not be used in LTE implementations.

The RRC 755 may configure, via one or more management service access points (M-SAP), aspects of one or more protocol layers, which may include one or more instances of PHY 710, MAC 720, RLC 730, PDCP 740 and SDAP 747. In embodiments, an instance of RRC 755 may process requests from and provide indications to one or more NAS entities 757 via one or more RRC-SAPs 756. The main services and functions of the RRC 755 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 757 may form the highest stratum of the control plane between the UE 101 and the AMF 321. The NAS 757 may support the mobility of the UEs 101 and the session management procedures to establish and maintain IP connectivity between the UE 101 and a P-GW in LTE systems.

According to various embodiments, one or more protocol entities of arrangement 700 may be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In such embodiments, one or more protocol entities that may be implemented in one or more of UE 101, gNB 111, AMF 321, etc. may communicate with a respective peer protocol entity that may be implemented in or on another device using the services of respective lower layer protocol entities to perform such communication. In some embodiments, a gNB-CU of the gNB 111 may host the RRC 755, SDAP 747, and PDCP 740 of the gNB that controls the operation of one or more gNB-DUs, and the gNB-DUs of the gNB 111 may each host the RLC 730, MAC 720, and PHY 710 of the gNB 111.

In a first example, a control plane protocol stack may comprise, in order from highest layer to lowest layer, NAS 757, RRC 755, PDCP 740, RLC 730, MAC 720, and PHY 710. In this example, upper layers 760 may be built on top of the NAS 757, which includes an IP layer 761, an SCTP 762, and an application layer signaling protocol (AP) 763.

In NR implementations, the AP 763 may be an NG application protocol layer (NGAP or NG-AP) 763 for the NG interface 113 defined between the NG-RAN node 111 and the AMF 321, or the AP 763 may be an Xn application protocol layer (XnAP or Xn-AP) 763 for the Xn interface 112 that is defined between two or more RAN nodes 111.

The NG-AP 763 may support the functions of the NG interface 113 and may comprise Elementary Procedures (EPs). An NG-AP EP may be a unit of interaction between the NG-RAN node 111 and the AMF 321. The NG-AP 763 services may comprise two groups: UE-associated services (e.g., services related to a UE 101, 102) and non-UE-associated services (e.g., services related to the whole NG interface instance between the NG-RAN node 111 and AMF 321). These services may include functions including, but not limited to: a paging function for the sending of paging requests to NG-RAN nodes 111 involved in a particular paging area; a UE conte6 management function for allowing the AMF 321 to establish, modify, and/or release a UE conte6 in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 763 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210), such as handover preparation and cancellation procedures, SN Status Transfer procedures, UE conte6 retrieval and UE conte6 release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 763 may be an S1 Application Protocol layer (S1-AP) 763 for the S1 interface 113 defined between an E-UTRAN node 111 and an MME, or the AP 763 may be an X2 application protocol layer (X2AP or X2-AP) 763 for the X2 interface 112 that is defined between two or more E-UTRAN nodes 111.

The S1 Application Protocol layer (S1-AP) 763 may support the functions of the S1 interface, and similar to the NG-AP discussed previously, the S1-AP may comprise S1-AP EPs. An S1-AP EP may be a unit of interaction between the E-UTRAN node 111 and an MME 221 within an LTE CN 120. The S1-AP 763 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 763 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE conte6 retrieval and UE conte6 release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 762 may provide guaranteed delivery of application layer messages (e.g., NGAP or XnAP messages in NR implementations, or S1-AP or X2AP messages in LTE implementations). The SCTP 762 may ensure reliable delivery of signaling messages between the RAN node 111 and the AMF 321/MME 221 based, in part, on the IP protocol, supported by the IP 761. The Internet Protocol layer (IP) 761 may be used to perform packet addressing and routing functionality. In some implementations the IP layer 761 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 747, PDCP 740, RLC 730, MAC 720, and PHY 710. The user plane protocol stack may be used for communication between the UE 101, the RAN node 111, and UPF 302 in NR implementations or an S-GW 222 and P-GW 223 in LTE implementations. In this example, upper layers 751 may be built on top of the SDAP 747, and may include a user datagram protocol (UDP) and IP security layer (UDP/IP) 752, a General Packet Radio Service (GPRS) Tunneling Protocol for the user plane layer (GTP-U) 753, and a User Plane PDU layer (UP PDU) 763.

The transport network layer 754 (also referred to as a "transport layer") may be built on IP transport, and the GTP-U 753 may be used on top of the UDP/IP layer 752 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 753 may be used for carrying user data within the GPRS core network and between the radio access network and the core network. The user data transported can be packets in any of IPv4, IPv6, or PPP formats, for example. The UDP/IP 752 may provide checksums for data integrity, port numbers for addressing different functions at the source and destination, and encryption and authentication on the selected data flows. The RAN node 111 and the S-GW 222 may utilize an S1-U interface to exchange user plane data via a protocol stack comprising an L1 layer (e.g., PHY 710), an L2 layer (e.g., MAC 720, RLC 730, PDCP 740, and/or SDAP 747), the UDP/IP layer 752, and the GTP-U 753. The S-GW 222 and the P-GW 223 may utilize an S5/S8a interface to exchange user plane data via a protocol stack comprising an L1 layer, an L2 layer, the UDP/IP layer 752, and the GTP-U 753. As discussed previously, NAS protocols may support the mobility of the UE 101 and the session management procedures to establish and maintain IP connectivity between the UE 101 and the P-GW 223.

Moreover, although not shown by FIG. 7, an application layer may be present above the AP 763 and/or the transport network layer 754. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 6110. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 8:
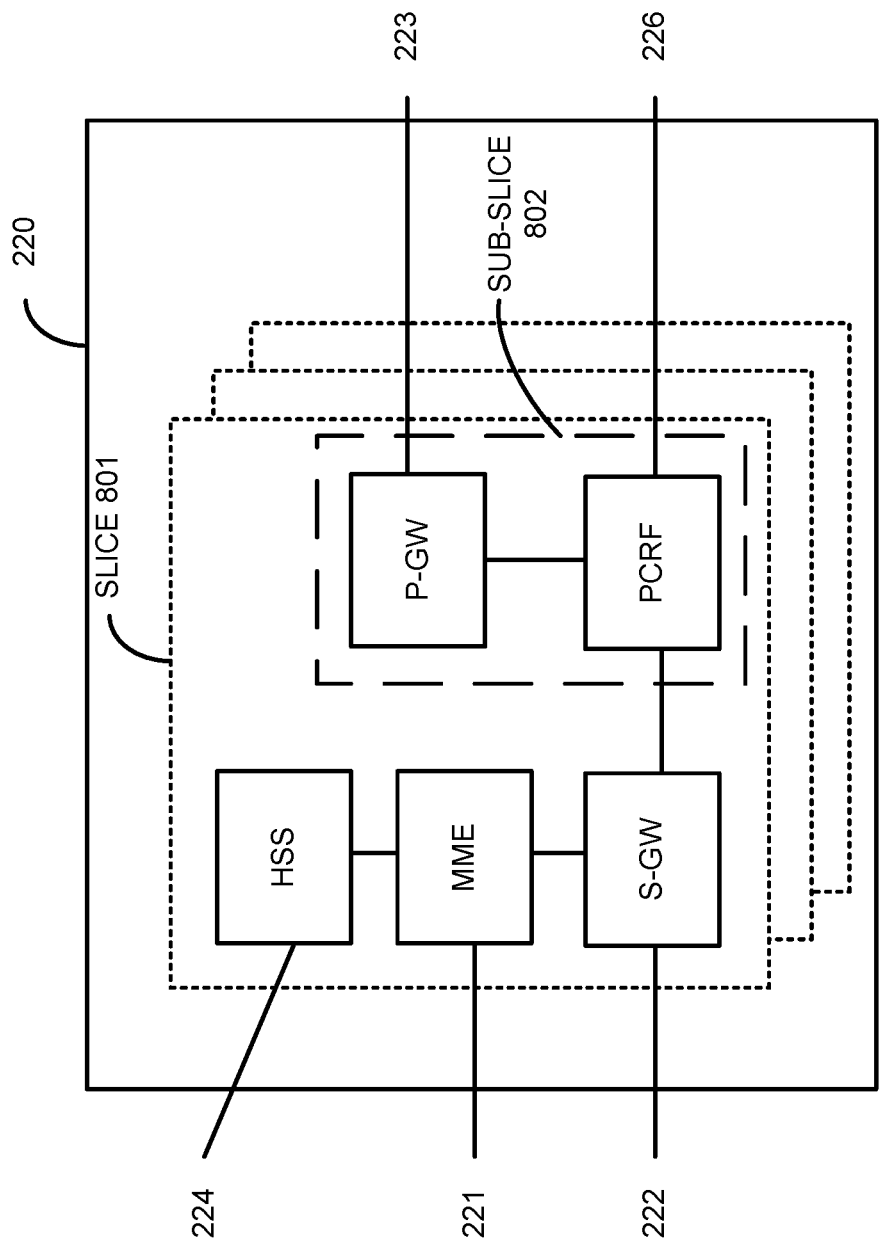
FIG. 8 illustrates components of a core network, according to some embodiments of the disclosure.

FIG. 8 illustrates components of a core network in accordance with various embodiments. The components of the CN 220 may be implemented in one physical node or separate physical nodes including components to read and execute instructions from a machine-readable or computer-readable medium (e.g., a non-transitory machine-readable storage medium). In embodiments, the components of CN 320 may be implemented in a same or similar manner as discussed herein with regard to the components of CN 220. In some embodiments, NFV is utilized to virtualize any or all of the above-described network node functions via executable instructions stored in one or more computer-readable storage mediums (described in further detail below). A logical instantiation of the CN 220 may be referred to as a network slice 801, and individual logical instantiations of the CN 220 may provide specific network capabilities and network characteristics. A logical instantiation of a portion of the CN 220 may be referred to as a network sub-slice 802 (e.g., the network sub-slice 802 is shown to include the P-GW 223 and the PCRF 226).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 3), a network slice always comprises a RAN part and a CN part. The support of network slicing relies on the principle that traffic for different slices is handled by different PDU sessions. The network can realize the different network slices by scheduling and also by providing different L1/L2 configurations. The UE 301 provides assistance information for network slice selection in an appropriate RRC message, if it has been provided by NAS. While the network can support large number of slices, the UE need not support more than 8 slices simultaneously.

A network slice may include the CN 320 control plane and user plane NFs, NG-RANs 310 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 301 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 321 instance serving an individual UE 301 may belong to each of the network slice instances serving that UE.

Network Slicing in the NG-RAN 310 involves RAN slice awareness. RAN slice awareness includes differentiated handling of traffic for different network slices, which have been pre-configured. Slice awareness in the NG-RAN 310 is introduced at the PDU session level by indicating the S-NSSAI corresponding to a PDU session in all signaling that includes PDU session resource information. How the NG-RAN 310 supports the slice enabling in terms of NG-RAN functions (e.g., the set of network functions that comprise each slice) is implementation dependent. The NG-RAN 310 selects the RAN part of the network slice using assistance information provided by the UE 301 or the 5GC 320, which unambiguously identifies one or more of the pre-configured network slices in the PLMN. The NG-RAN 310 also supports resource management and policy enforcement between slices as per SLAs. A single NG-RAN node may support multiple slices, and the NG-RAN 310 may also apply an appropriate RRM policy for the SLA in place to each supported slice. The NG-RAN 310 may also support QoS differentiation within a slice.

The NG-RAN 310 may also use the UE assistance information for the selection of an AMF 321 during an initial attach, if available. The NG-RAN 310 uses the assistance information for routing the initial NAS to an AMF 321. If the NG-RAN 310 is unable to select an AMF 321 using the assistance information, or the UE 301 does not provide any such information, the NG-RAN 310 sends the NAS signaling to a default AMF 321, which may be among a pool of AMFs 321. For subsequent accesses, the UE 301 provides a temp ID, which is assigned to the UE 301 by the 5GC 320, to enable the NG-RAN 310 to route the NAS message to the appropriate AMF 321 as long as the temp ID is valid. The NG-RAN 310 is aware of, and can reach, the AMF 321 that is associated with the temp ID. Otherwise, the method for initial attach applies.

The NG-RAN 310 supports resource isolation between slices. NG-RAN 310 resource isolation may be achieved by means of RRM policies and protection mechanisms that should avoid that shortage of shared resources if one slice breaks the service level agreement for another slice. In some implementations, it is possible to fully dedicate NG-RAN 310 resources to a certain slice. How NG-RAN 310 supports resource isolation is implementation dependent.

Some slices may be available only in part of the network. Awareness in the NG-RAN 310 of the slices supported in the cells of its neighbors may be beneficial for inter-frequency mobility in connected mode. The slice availability may not change within the UE's registration area. The NG-RAN 310 and the 5GC 320 are responsible to handle a service request for a slice that may or may not be available in a given area. Admission or rejection of access to a slice may depend on factors such as support for the slice, availability of resources, support of the requested service by NG-RAN 310.

The UE 301 may be associated with multiple network slices simultaneously. In case the UE 301 is associated with multiple slices simultaneously, only one signaling connection is maintained, and for intra-frequency cell reselection, the UE 301 tries to camp on the best cell. For inter-frequency cell reselection, dedicated priorities can be used to control the frequency on which the UE 301 camps. The 5GC 320 is to validate that the UE 301 has the rights to access a network slice. Prior to receiving an Initial Conte6 Setup Request message, the NG-RAN 310 may be allowed to apply some provisional/local policies, based on awareness of a particular slice that the UE 301 is requesting to access. During the initial conte6 setup, the NG-RAN 310 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 9:
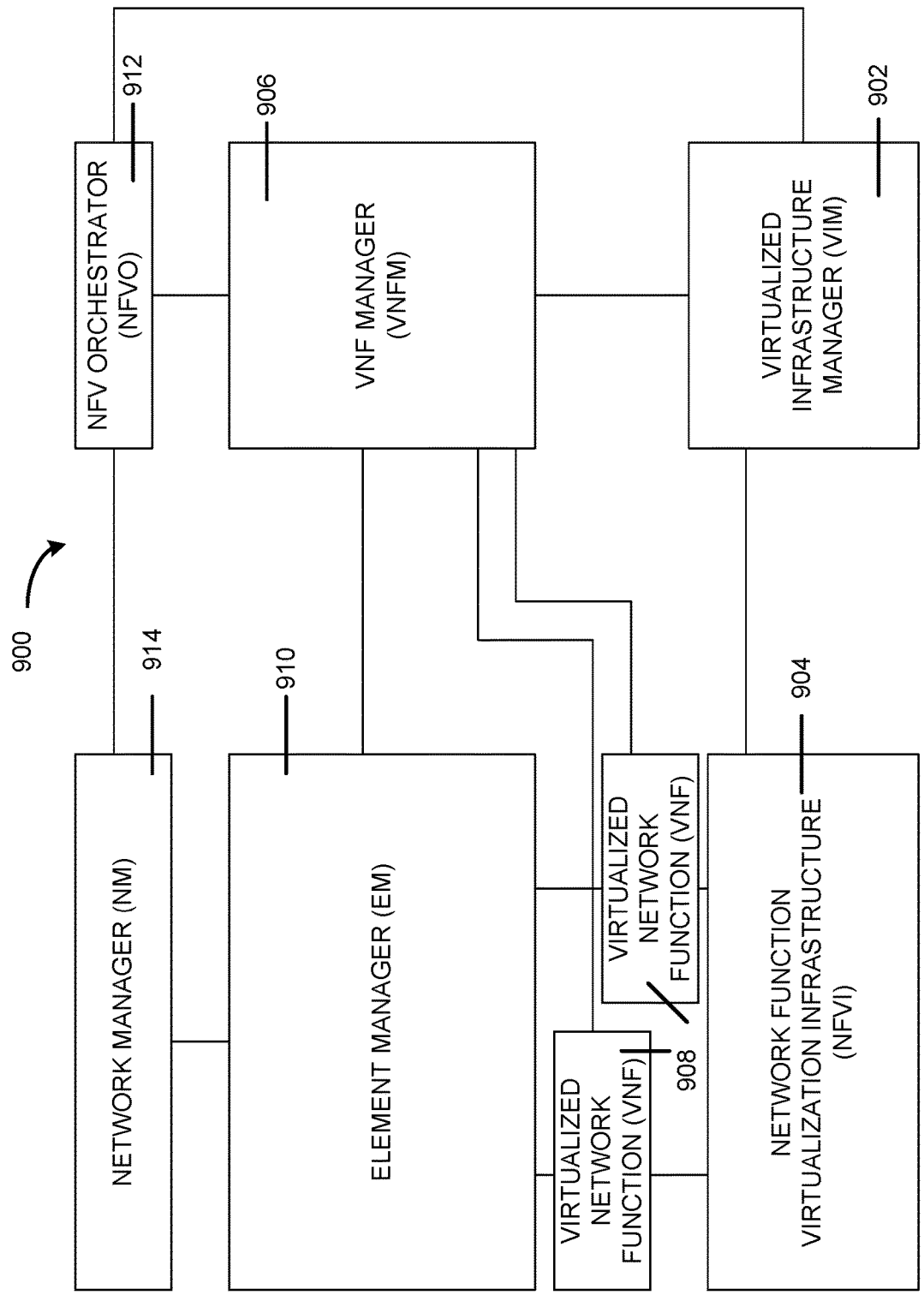
FIG. 9 is a block diagram illustrating components of a system to support NFV, according to some embodiments of the disclosure.

FIG. 9 is a block diagram illustrating components, according to some example embodiments, of a system 900 to support NFV. The system 900 is illustrated as including a VIM 902, an NFVI 904, an VNFM 906, VNFs 908, an EM 910, an NFVO 912, and a NM 914.

The VIM 902 manages the resources of the NFVI 904. The NFVI 904 can include physical or virtual resources and applications (including hypervisors) used to execute the system 900. The VIM 902 may manage the life cycle of virtual resources with the NFVI 904 (e.g., creation, maintenance, and tear down of VMs associated with one or more physical resources), track VM instances, track performance, fault and security of VM instances and associated physical resources, and expose VM instances and associated physical resources to other management systems.

The VNFM 906 may manage the VNFs 908. The VNFs 908 may be used to execute EPC components/functions. The VNFM 906 may manage the life cycle of the VNFs 908 and track performance, fault and security of the virtual aspects of VNFs 908. The EM 910 may track the performance, fault and security of the functional aspects of VNFs 908. The tracking data from the VNFM 906 and the EM 910 may comprise, for example, PM data used by the VIM 902 or the NFVI 904. Both the VNFM 906 and the EM 910 can scale up/down the quantity of VNFs of the system 900.

The NFVO 912 may coordinate, authorize, release and engage resources of the NFVI 904 in order to provide the requested service (e.g., to execute an EPC function, component, or slice). The NM 914 may provide a package of end-user functions with the responsibility for the management of a network, which may include network elements with VNFs, non-virtualized network functions, or both (management of the VNFs may occur via the EM 910).

Figure 10:
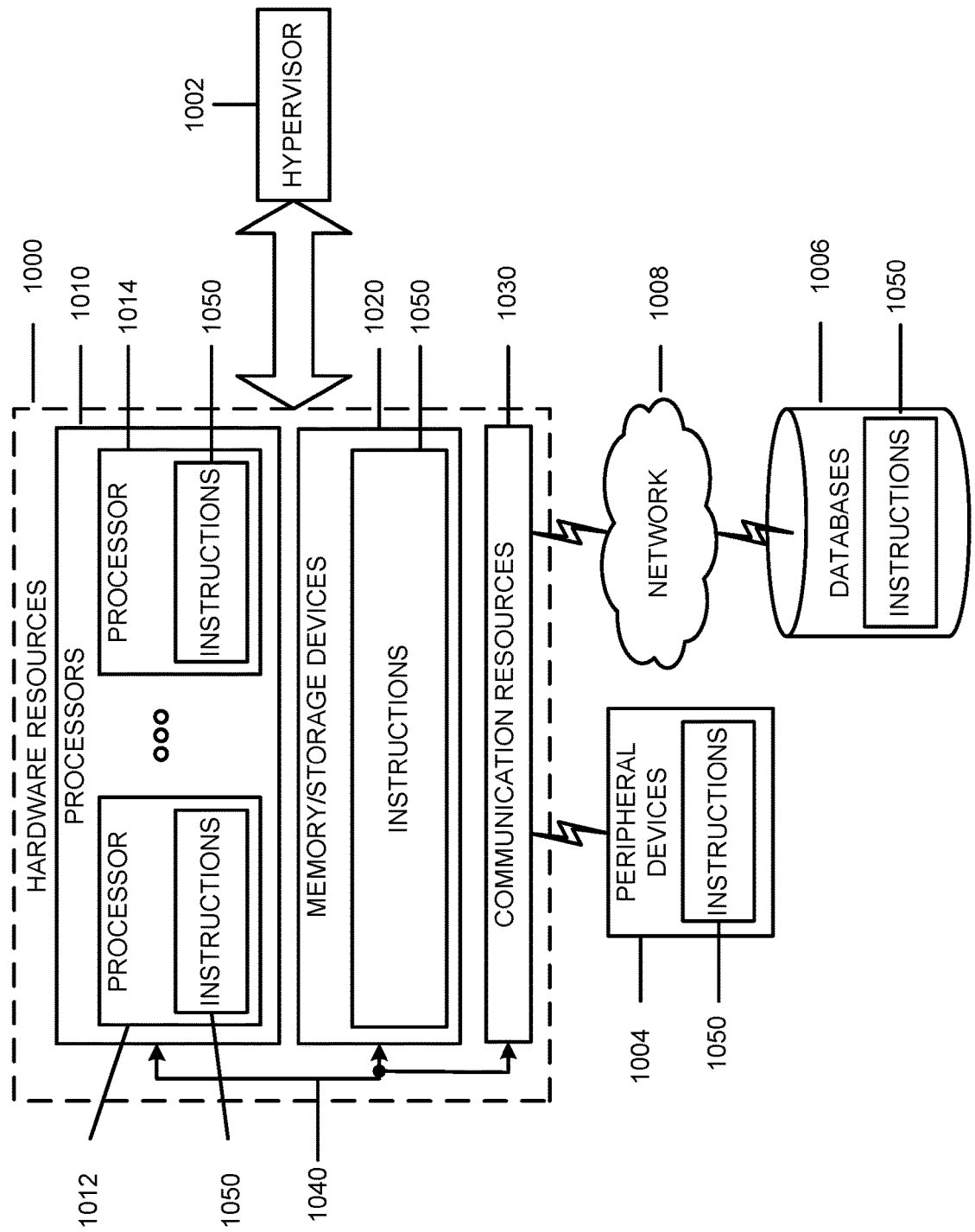
FIG. 10 is a block diagram illustrating components, according to some example embodiments, able to read instructions from a machine-readable or computer-readable medium (e.g., a non-transitory machine-readable storage medium) and perform any one or more of the methodologies discussed herein, according to some embodiments of the disclosure.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processor(s) 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via USB), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include the method for provisioning Interactive service to a UE for cloud rendering gaming in 5GS.

Example 2 may include the method of example 1 or some other example herein, whereby the UE to use cloud rendering gaming in 5GS have subscription for interactive services and the service authorization for the cloud rendering gaming.

Example 3 may include the method of example 1 or some other example herein, whereby the service authorization can be configured by the PCF using UE configuration update procedure as indicated in clause 4.2.4.3 of TS 23.502, in which the service authorization is sent via Namf_Communication_N1N2MessageTransfer message.

Example 4 may include the method of example 3 or some other example herein, whereby the service authorization information for cloud rendering gaming authorization includes the following information:
Application ID
List of allowed PLMNs
List of DNNs (optionally with indication of LADN: local area data network) per PLMN
List of cloud rendering server IP addresses and port numbers per DNN, PLMN
Priority per cloud rendering server
Validity criteria, e.g. service time, allowed service geographical areas, "user's consent agreement".

Example 5 may include the method of example 4 or some other example herein, whereby the authorization information can include more than one application IDs with corresponding configuration information.

Example 6 may include the method of example 5 or some other example herein, whereby UE configuration update procedure is triggered by the AF for updating service authorization of the cloud rendering gaming of the UE by sending a request to a PCF or via NEF, which includes the following information:

Application ID
List of allowed PLMNs
List of DNNs per PLMN
List of cloud rendering server IP addresses and port numbers per DNN, PLMN
Priority per cloud rendering server
Validity criteria, e.g. service time, allowed service geographical areas, "user's consent agreement".

Example 7 may include the method for provisioning assistant information related to the traffic pattern of Interactive service to a UE for cloud rendering gaming in 5GS.

Example 8 may include the method of example 7 or some other example herein, whereby the traffic pattern is estimated by the AF and provided to 5G network with the following information:
Application ID
Application Type Description: cloud rendering gaming, e.g. video streaming, file streaming
Traffic patterns parameters per application
Traffic pattern duration
Time frame size, e.g. 10 secs, 30 secs, 1 min, 5 mins
interactive downlink traffic arrival rate and volume per time frame (traffic rate) (for video streaming the real-time gaming scene)
interactive uplink traffic arrival rate and volume per time frame (traffic rate) (for commands and control)

Example 9 may include the method of example 8 or some other example herein, whereby the traffic pattern information can be provided with conditions of geographical area per UE, IP flow, or User group identified by Group ID known by the network.

Example 10 may include the method of example 9 or some other example herein, whereby the traffic pattern information is provided per IP flow in AF session set up with required QoS procedure.

Example 11 may include the method of example 9 or some other example herein, whereby the traffic pattern information is provided per UE in the external parameter provisioning procedure.

Example 12 may include the method of example 10 or some other example herein, whereby the traffic pattern is provided per Traffic Description and target UE(s), per application and is used for steering user plane route and reselection of UPF.

Example 13 may include a method comprising: determining service authorization information for a UE, the service authorization information associated with interactive service on a 5G wireless cellular network, and wherein the service authorization information includes one or more of: an Application ID, a list of allowed PLMNs, a list of DNNs per PLMN, a list of cloud rendering server IP addresses and port numbers for respective DNNs and/or PLMNs, a priority of different cloud rendering servers, or validity criteria; and transmitting or causing to transmit the service authorization information.

Example 14 may include the method of Example 13 or another example herein, wherein the list of DNNs includes an indication of a local area data network.

Example 15 may include the method of Example 13-14 or another example herein, wherein the validity criteria includes one or more of a service time, one or more allowed service geographical areas, or agreement to a user's consent agreement.

Example 16 may include the method of Example 13-15 or another example herein, wherein the service authorization information is transmitted to an authentication and mobility management function (AMF) to enable authorization of the interactive service for the UE.

Example 17 may include the method of Example 13-16 or another example herein, wherein the service authorization information is transmitted via a Namf_Communication_N1N2MessageTransfer message.

Example 18 may include the method of Example 13-17 or another example herein, further comprising: determining an update to the service authorization information; and transmitting the updated service authorization information.

Example 19 may include the method of Example 13-18 or another example herein, wherein the method is performed by a policy control function (PCF) or a portion thereof.

Example 20 may include a method comprising: receiving service authorization information for a UE, the service authorization information associated with interactive service on a 5G wireless cellular network, and wherein the service authorization information includes one or more of: an Application ID, a list of allowed PLMNs, a list of DNNs per PLMN, a list of cloud rendering server IP addresses and port numbers for respective DNNs and/or PLMNs, a priority of different cloud rendering servers, or validity criteria; determining UE policies for the UE based on the service authorization information, the UE policies to be used by the UE to access the interactive service; and transmitting or causing to transmit the UE policies to the UE.

Example 21 may include the method of Example 20 or another example herein, wherein the UE policies include some or all of the service authorization information.

Example 22 may include the method of Example 20-21 or another example herein, wherein the list of DNNs includes an indication of a local area data network.

Example 23 may include the method of Example 20-22 or another example herein, wherein the validity criteria includes one or more of a service time, one or more allowed service geographical areas, or agreement to a user's consent agreement.

Example 24 may include the method of Example 20-23 or another example herein, wherein the service authorization information is received from a policy control function.

Example 25 may include the method of Example 20-24 or another example herein, wherein the service authorization information is received via a Namf_Communication_N1N2MessageTransfer message.

Example 26 may include the method of Example 20-25 or another example herein, further comprising: receiving updated service authorization information for the UE; and transmitting or causing to transmit updated UE policies to the UE based on the updated service authorization information.

Example 27 may include the method of Example 20-26 or another example herein, wherein the method is performed by an authentication and mobility management function (AMF) or a portion thereof.

Example 28 may include a method comprising: receiving UE policies for accessing interactive service on a 5G wireless cellular network, wherein the UE policies include one or more of: an Application ID, a list of allowed PLMNs, a list of DNNs per PLMN, a list of cloud rendering server IP addresses and port numbers for respective DNNs and/or PLMNs, a priority of different cloud rendering servers, or validity criteria; and accessing an interactive service based on the UE policies.

Example 29 may include the method of example 28 or another example herein, wherein the accessing the interactive service based on the UE policies includes selecting a cloud rendering server with a highest priority that satisfies the validity criteria.

Example 30 may include the method of Example 28-29 or another example herein, wherein the list of DNNs includes an indication of a local area data network.

Example 31 may include the method of Example 28-30 or another example herein, wherein the validity criteria includes one or more of a service time, one or more allowed service geographical areas, or agreement to a user's consent agreement.

Example 32 may include the method of Example 28-31 or another example herein, further comprising: receiving updated UE policies for accessing interactive service; and accessing the interactive service based on the updated UE policies.

Example 33 may include the method of Example 28-32 or another example herein, wherein the method is performed by a user equipment (UE) or a portion thereof.

Example 34 may include a method comprising: determining assistance information associated with an interactive service accessed by a UE, wherein the assistance information includes one or more of: an Application ID; an Application Type Description; or one or more Traffic pattern parameters; and transmitting or causing to transmit, the assistance information.

Example 35 may include the method of Example 34 or another example herein, wherein the traffic pattern parameters are associated with individual applications.

Example 36 may include the method of Example 34-35 or another example herein, wherein the application type description indicates whether the associated Application ID corresponds to a cloud rendered video game.

Example 37 may include the method of Example 34-36 or another example herein, wherein the one or more traffic pattern parameters include one or more of: Traffic pattern duration; Time frame size; interactive downlink traffic packet arrival rate, packet size, and/or volume per time frame; or interactive uplink traffic packet arrival rate, packet size, and/or volume per time frame.

Example 38 may include the method of Example 34-37 or another example herein, further comprising receiving a request for the assistance information, wherein the assistance information is transmitted responsive to the request.

Example 39 may include the method of Example 34-38 or another example herein, wherein the assistance information is transmitted to or by an application function (AF).

Example 40 may include the method of Example 34-39 or another example herein, wherein the assistance information is transmitted with information to indicate a required quality of service (QoS).

Example 41 may include the method of Example 34-40 or another example herein, wherein the assistance information is transmitted in a Nnef_AFsessionWithQoS_Create request message.

Example 42 may include the method of Example 34-41 or another example herein, wherein the method is performed by an application function (AF) or a portion thereof.

Example 43 may include the method of Example 34-41, wherein the method is performed by a user equipment (UE) or a portion thereof.

Example 44 may include a method comprising: receiving assistance information associated with an interactive service accessed by a UE, wherein the assistance information includes one or more of: an Application ID; an Application Type Description; or one or more Traffic pattern parameters; and controlling the UE's access of the interactive service based on the assistance information.

Example 45 may include the method of Example 44 or another example herein, wherein the traffic pattern parameters are associated with individual applications.

Example 46 may include the method of Example 44-45 or another example herein, wherein the application type description indicates whether the associated Application ID corresponds to a cloud rendered video game.

Example 47 may include the method of Example 44-46 or another example herein, wherein the one or more traffic pattern parameters include one or more of: Traffic pattern duration; Time frame size; interactive downlink traffic packet arrival rate, packet size, and/or volume per time frame; or interactive uplink traffic packet arrival rate, packet size, and/or volume per time frame.

Example 48 may include the method of Example 44-47 or another example herein, further comprising transmitting or causing to transmit a request for the assistance information, wherein the assistance information is received responsive to the request.

Example 49 may include the method of Example 44-48 or another example herein, wherein the method is performed by an application function (AF) or a portion thereof.

Example 50 may include a method comprising: generating an uplink data packet with one or more commands for an interactive service on a 5G wireless cellular network; inserting an indicator in the uplink data packet to indicate that the uplink data packet is to be provided priority handling; and transmitting or causing to transmit the uplink data packet with the indicator.

Example 51 may include the method of Example 50, wherein the priority handling corresponds to ultra reliability and low latency handling.

Example 52 may include the method of Example 50-51, further comprising indicating to a session management function (SMF) that the UE will be accessing the interactive service.

Example 53 may include the method of Example 52 or another example herein, wherein the indicating is performed as part of establishing a PDU session with the SMF.

Example 54 may include the method of Example 50-53 or another example herein, wherein the method is performed by a UE or a portion thereof.

Example 55 may include the method of Example 13-54 or another example herein, wherein the interactive service is a cloud rendered video game.

Example 56 may include an apparatus comprising means to perform one or more elements of a method described in or related to any of examples 1-55, or any other method or process described herein.

Example 57 may include one or more non-transitory computer-readable media comprising instructions to cause an electronic device, upon execution of the instructions by one or more processors of the electronic device, to perform one or more elements of a method described in or related to any of examples 1-55, or any other method or process described herein.

Example 58 may include an apparatus comprising logic, modules, or circuitry to perform one or more elements of a method described in or related to any of examples 1-55, or any other method or process described herein.

Example 59 may include a method, technique, or process as described in or related to any of examples 1-55, or portions or parts thereof.

Example 60 may include an apparatus comprising: one or more processors and one or more computer-readable media comprising instructions that, when executed by the one or more processors, cause the one or more processors to perform the method, techniques, or process as described in or related to any of examples 1-55, or portions thereof.

Example 61 may include a signal as described in or related to any of examples 1-55, or portions or parts thereof.

Example 62 may include a signal in a wireless network as shown and described herein.

Example 63 may include a method of communicating in a wireless network as shown and described herein.

Example 64 may include a system for providing wireless communication as shown and described herein.

Example 65 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein, but are not meant to be limiting.

3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation
AP Application Protocol, Antenna Port, Access Point
API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
ECCA e6ended clear channel assessment, e6ended CCA
ECCE Enhanced Control Channel Element, Enhanced CCE ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Ne6 Generation NodeB
gNB-CU gNB-centralized unit, Ne6 Generation NodeB centralized unit
gNB-DU gNB-distributed unit, Ne6 Generation NodeB distributed unit
GNSS Global Navigation Satellite System
GPRS General Packet Radio Service
GSM Global System for Mobile Communications, Groupe Spécial Mobile
GTP GPRS Tunneling Protocol
GTP-U GPRS Tunnelling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO, HO Handover
HFN HyperFrame Number
HHO Hard Handover
HLR Home Location Register
HN Home Network
HO Handover
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Te6 Transfer Protocol
HTTPS Hyper Te6 Transfer Protocol Secure (https is http/1.1 over SSL, i.e. port 443)
I-Block Information Block
ICCID Integrated Circuit Card Identification
ICIC Inter-Cell Interference Coordination
ID Identity, identifier
IDFT Inverse Discrete Fourier Transform
IE Information element
IBE In-Band Emission
IEEE Institute of Electrical and Electronics Engineers
IEI Information Element Identifier
IEIDL Information Element Identifier Data Length
IETF Internet Engineering Task Force
IF Infrastructure
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
K Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LBT Listen Before Talk
LCM LifeCycle Management
LCR Low Chip Rate
LCS Location Services
LCID Logical Channel ID
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering conte6)
MAC Message authentication code (security/encryption conte6)
MAC-A MAC used for authentication and key agreement (TSG T WG3 conte6)
MAC-I MAC used for data integrity of signalling messages (TSG T WG3 conte6)
MANO Management and Orchestration
MBMS Multimedia Broadcast and Multicast Service
MBSFN Multimedia Broadcast multicast service Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management
MME Mobility Management Entity
MN Master Node
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massive MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non-Access Stratum layer
NCT Network Connectivity Topology
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Ne6 Generation, Ne6 Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAI 'Network Slice Selection Assistance Information
S-NNSAI Single-NS SAI
NSSF Network Slice Selection Function
NW Network
NWUS Narrowband wake-up signal, Narrowband WUS
NZP Non-Zero Power
O&M Operation and Maintenance
ODU2 Optical channel Data Unit—type 2
OFDM Orthogonal Frequency Division Multiplexing
OFDMA Orthogonal Frequency Division Multiple Access
OOB Out-of-band
OOS Out of Sync
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function PCRF Policy Control and Charging Rules Function
PDCP Packet Data Convergence Protocol, Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
MV Resource indicator value
RL Radio Link
RLC Radio Link Control, Radio Link Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SC-FDMA Single Carrier Frequency Division Multiple Access
SCG Secondary Cell Group
SCM Security Conte6 Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Service Discovery Protocol (Bluetooth related)
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastruction
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
VPLMN Visited Public Land Mobile Network
VPN Virtual Private Network
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML e6ensible Markup Language
XRES EXpected user RESponse
XOR eXclusive OR
ZC Zadoff-Chu
ZP Zero Power Terminology For the purposes of the present document, the following terms and definitions are applicable to the examples and embodiments discussed herein, but are not meant to be limiting.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA.

The term "Special Cell" refers to the PCell of the MCG or the PSCell of the SCG for DC operation; otherwise, the term "Special Cell" refers to the Pcell.

What is claimed is:

1. A method, comprising:
   determining service authorization information for a device, the service authorization information being associated with an interactive service on a wireless network, wherein the service authorization information comprises at least one of: a list of cloud rendering server internet protocol (IP) addresses, priority per cloud rendering server, and validity criteria, wherein the validity criteria comprises at least one of service time, allowed service geographical areas, or user's consent agreement;
   determining device policies for the device based on the service authorization information, wherein the device policies comprise the service authorization information; and
   transmitting the device policies to the device, wherein the device policies enable the device to select a cloud rendering server for the interactive service.

2. The method of claim 1, wherein the service authorization information further includes at least one of the following:
   an application ID;
   a list of allowed public land mobile networks (PLMNs);
   a list of data network names (DNNs) per PLMN; or
   a list of cloud rendering server IP addresses and port numbers per DNN and PLMN.

3. The method of claim 1, wherein the device is configured to select a cloud rendering server with a highest priority that satisfies the validity criteria.

4. The method of claim 1, wherein determining the service authorization information comprises determining the service authorization information using a device configuration update procedure.

5. The method of claim 4, further comprising sending a request to a policy control function (PCF) to trigger the device configuration update procedure.

6. The method of claim 1, further comprising:
   determining an update to the service authorization information; and
   transmitting the updated service authorization information to the device, wherein the updated service authorization information causes the device to select a different cloud rendering server for the interactive service.

7. An apparatus comprising:
   radio front end circuitry;
   a processor, coupled to the radio front end circuitry; and
   a memory that stores instructions that, when executed by the processor, cause the processor to:
   determine service authorization information for a device, the service authorization information being associated with an interactive service on a wireless network, wherein the service authorization information comprises at least a list of cloud rendering server internet protocol (IP) addresses, priority per cloud rendering server, and validity criteria, wherein the validity criteria comprises at least one of service time, allowed service geographical areas, or user's consent agreement;
   determine device policies for the device based on the service authorization information, wherein the device policies comprise the service authorization information; and
   transmit, using the radio front end circuitry, the device policies to the device, wherein the device policies enable the device to select a cloud rendering server for the interactive service.

8. The apparatus of claim 7, wherein the service authorization information further includes at least one of the following:
   an application ID;
   a list of allowed public land mobile networks (PLMNs);
   a list of data network names (DNNs) per PLMN; or
   a list of cloud rendering server IP addresses and port numbers per DNN and PLMN.

9. The apparatus of claim 7, wherein the device is configured to select a cloud rendering server with a highest priority that satisfies the validity criteria.

10. The apparatus of claim 7, wherein determining the service authorization information comprises determining the service authorization information using a device configuration update procedure.

11. The apparatus of claim 10, wherein the instructions further cause the processor to send a request to a policy control function (PCF) to trigger the device configuration update procedure.

12. The apparatus of claim 7, wherein the instructions further cause the processor to:
   determine an update to the service authorization information; and
   transmit, using the radio front end circuitry, the updated service authorization information to the device, wherein the updated service authorization information causes the device to select a different cloud rendering server for the interactive service.

13. A non-transitory computer-readable medium comprising instructions to cause an electronic device, upon execution of the instructions by one or more processors of the electronic device, to perform one or more operations, the operations comprising:
   determining service authorization information for a device, the service authorization information being associated with an interactive service on a wireless network, wherein the service authorization information comprises at least a list of cloud rendering server internet protocol (IP) addresses, priority per cloud rendering server, and validity criteria, wherein the validity criteria comprises at least one of service time, allowed service geographical areas, or user's consent agreement;

determining device policies for the device based on the service authorization information, wherein the device policies comprise the service authorization information; and transmitting the device policies to the device, wherein the device policies enable the device to select a cloud rendering server for the interactive service.

14. The non-transitory computer-readable medium of claim 13, wherein the device is configured to select a cloud rendering server with a highest priority that satisfies the validity criteria.

15. The non-transitory computer-readable medium of claim 13, wherein determining the service authorization information comprises determining the service authorization information using a device configuration update procedure.

16. The non-transitory computer-readable medium of claim 15, the operations further comprising sending a request to a policy control function (PCF) to trigger the device configuration update procedure.

17. The non-transitory computer-readable medium of claim 13, the operations further comprising:

determining an update to the service authorization information; and transmitting the updated service authorization information to the device, wherein the updated service authorization information causes the device to select a different cloud rendering server for the interactive service.

* * * * *

UNITED STATES PATENT AND TRADEMARK OFFICE
CERTIFICATE OF CORRECTION

| | | |
|---|---|---|
| PATENT NO. | : 12,185,106 B2 | Page 1 of 1 |
| APPLICATION NO. | : 17/427819 | |
| DATED | : December 31, 2024 | |
| INVENTOR(S) | : Ching-Yu Liao | |

It is certified that error appears in the above-identified patent and that said Letters Patent is hereby corrected as shown below:

On the Title Page

Item (54) and in the Specification, Column 1, Line 2, replace "RENDERTING" with --RENDERING--.

Signed and Sealed this
Eleventh Day of February, 2025

Coke Morgan Stewart
*Acting Director of the United States Patent and Trademark Office*